(12) United States Patent
Masi et al.

(10) Patent No.: US 9,334,341 B2
(45) Date of Patent: May 10, 2016

(54) CATALYSTS OF THE ZIEGLER-NATTA TYPE FOR THE (CO)POLYMERIZATION OF OLEFINS WITH A HIGH PRODUCTIVITY

(75) Inventors: Francesco Masi, Sant'Angelo Lodigiano (IT); Mario Polesello, Ferrara (IT); Roberto Fusco, Novara (IT); Anna Sommazzi, Novara (IT); Antonio Alfonso Proto, Novara (IT); Laura Meda, Galliate (IT); Tiziano Pennati, Curtatone (IT); Elena Maria Frigerio, legal representative, Curtatone (IT); Alessandro Pennati, legal representative, Curtatone (IT); Giuseppe Conti, Padenghe Sul Garda (IT); Francesco Menconi, Massa Macinaia (IT)

(73) Assignee: Versalis S.p.A., San Donato Milanese (IT)

( * ) Notice: Subject to any disclaimer, the term of this patent is extended or adjusted under 35 U.S.C. 154(b) by 0 days.

(21) Appl. No.: 13/511,481

(22) PCT Filed: Nov. 18, 2010

(86) PCT No.: PCT/EP2010/007067
§ 371 (c)(1),
(2), (4) Date: Aug. 28, 2012

(87) PCT Pub. No.: WO2011/060958
PCT Pub. Date: May 26, 2011

(65) Prior Publication Data
US 2012/0322959 A1 Dec. 20, 2012

(30) Foreign Application Priority Data
Nov. 23, 2009 (IT) .............................. MI2009A2057

(51) Int. Cl.
*C08F 4/646* (2006.01)
*C08F 4/16* (2006.01)
(Continued)

(52) U.S. Cl.
CPC .............. *C08F 10/00* (2013.01); *C08F 210/16* (2013.01); *C08F 2410/03* (2013.01)

(58) Field of Classification Search
USPC ........................ 526/124.3, 113; 502/107, 113
See application file for complete search history.

(56) References Cited

U.S. PATENT DOCUMENTS

| 6,723,809 B1 | 4/2004 | Menconi et al. |
| 2013/0040805 A1 | 2/2013 | Conti et al. |

FOREIGN PATENT DOCUMENTS

| WO | 00 58368 | 10/2000 |

OTHER PUBLICATIONS

Magni, E. et al. "Gold-Induced MGCl$_2$ Reduction by ATEt$_3$, Surface Science Study of a Novel Reaction and Its Potential Application in Ziegler-Natta Catalysis.", Langmuir, vol. 16, p. 8113-8121, (Jan. 1, 2000).

(Continued)

*Primary Examiner* — Ling Choi
*Assistant Examiner* — Catherine S Branch
(74) *Attorney, Agent, or Firm* — Oblon, McClelland, Maier & Neustadt, L.L.P.

(57) ABSTRACT

Solid catalyst with a high thermal stability for the (co)polymerization of α-olefins, comprising titanium, magnesium, at least one metal selected from hafnium and zirconium, aluminum and chlorine, wherein at least 60% of the titanium is in oxidation state +3, and, when examined by means of XPS spectroscopy, has an absorption band characteristic of a binding energy ranging from 455 to 458 eV. Said catalyst, used in combination with a suitable co-catalyst in (co)polymerization processes of α-olefins at a high temperature, shows an improved productivity, a high incorporation of co-monomers in the copolymerization of ethylene and an increased thermal stability with respect to the systems so far in use.

26 Claims, 3 Drawing Sheets

Figure 1:
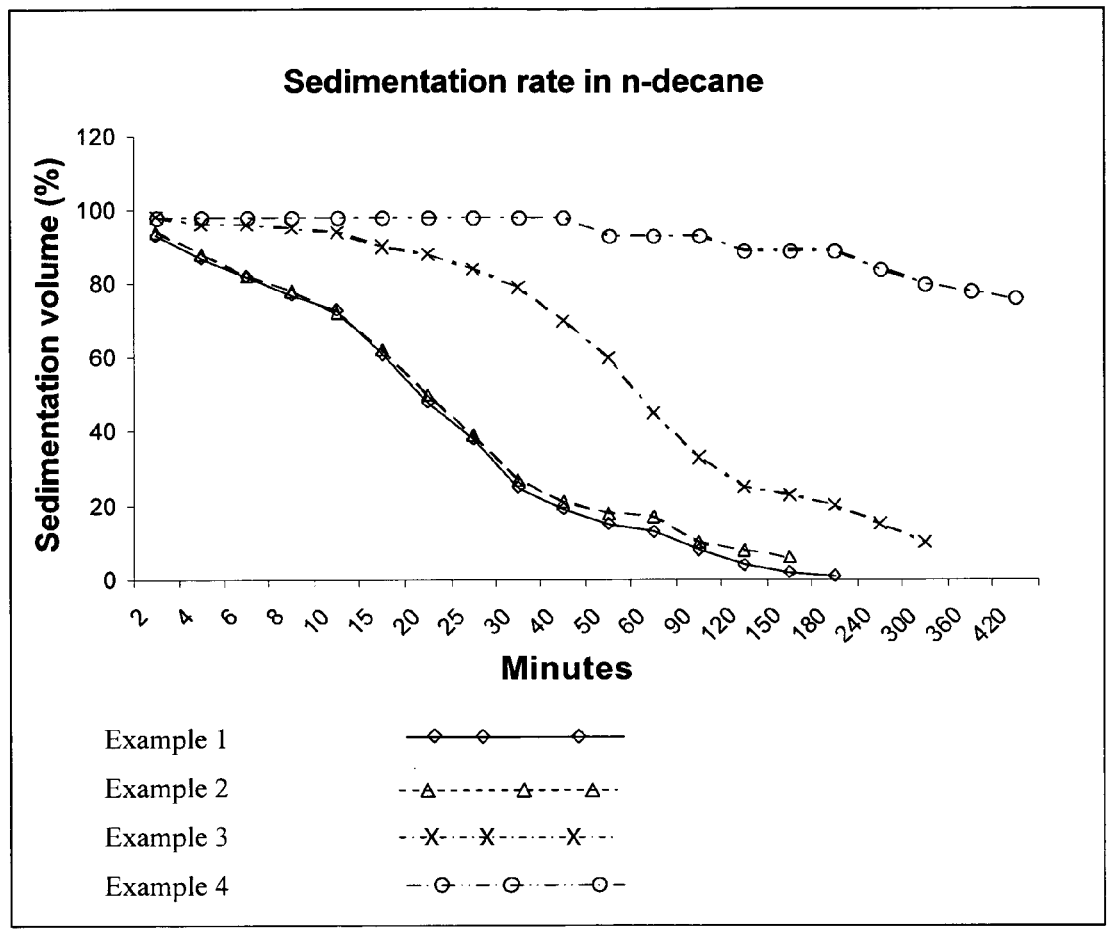

(51) Int. Cl.
*C08F 2/06* (2006.01)
*C08F 4/654* (2006.01)
*C08F 10/00* (2006.01)
*C08F 210/16* (2006.01)

(56) References Cited

OTHER PUBLICATIONS

International Search Report issued Feb. 23, 2011 in PCT/EP2010/07067 Filed Nov. 18, 2010.

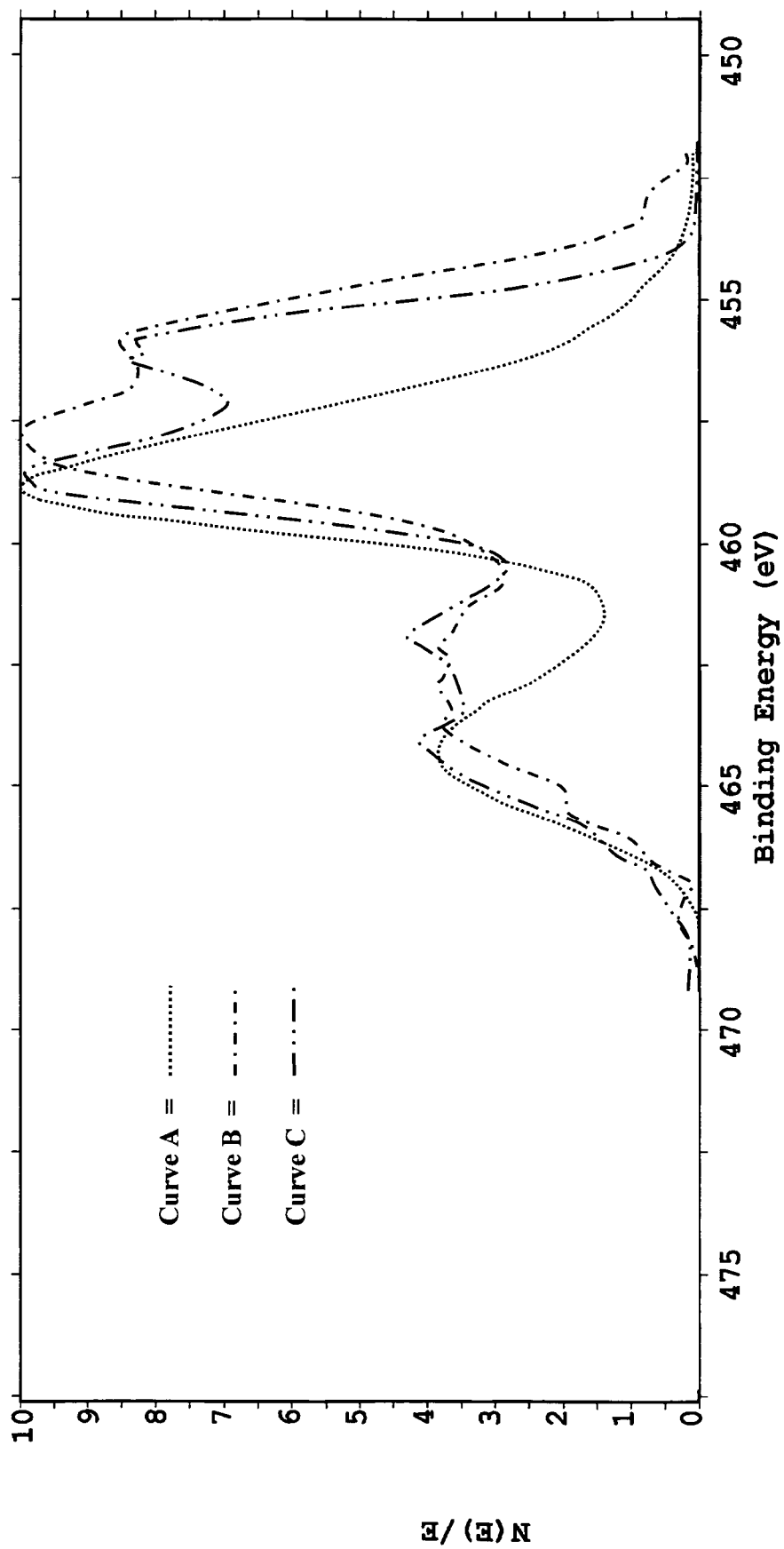
Fig. 2 XPS analysis of model complexes; Curve A = TiCl$_3$(THF)$_3$; Curve B = Complex M1; Curve C = Complex M2

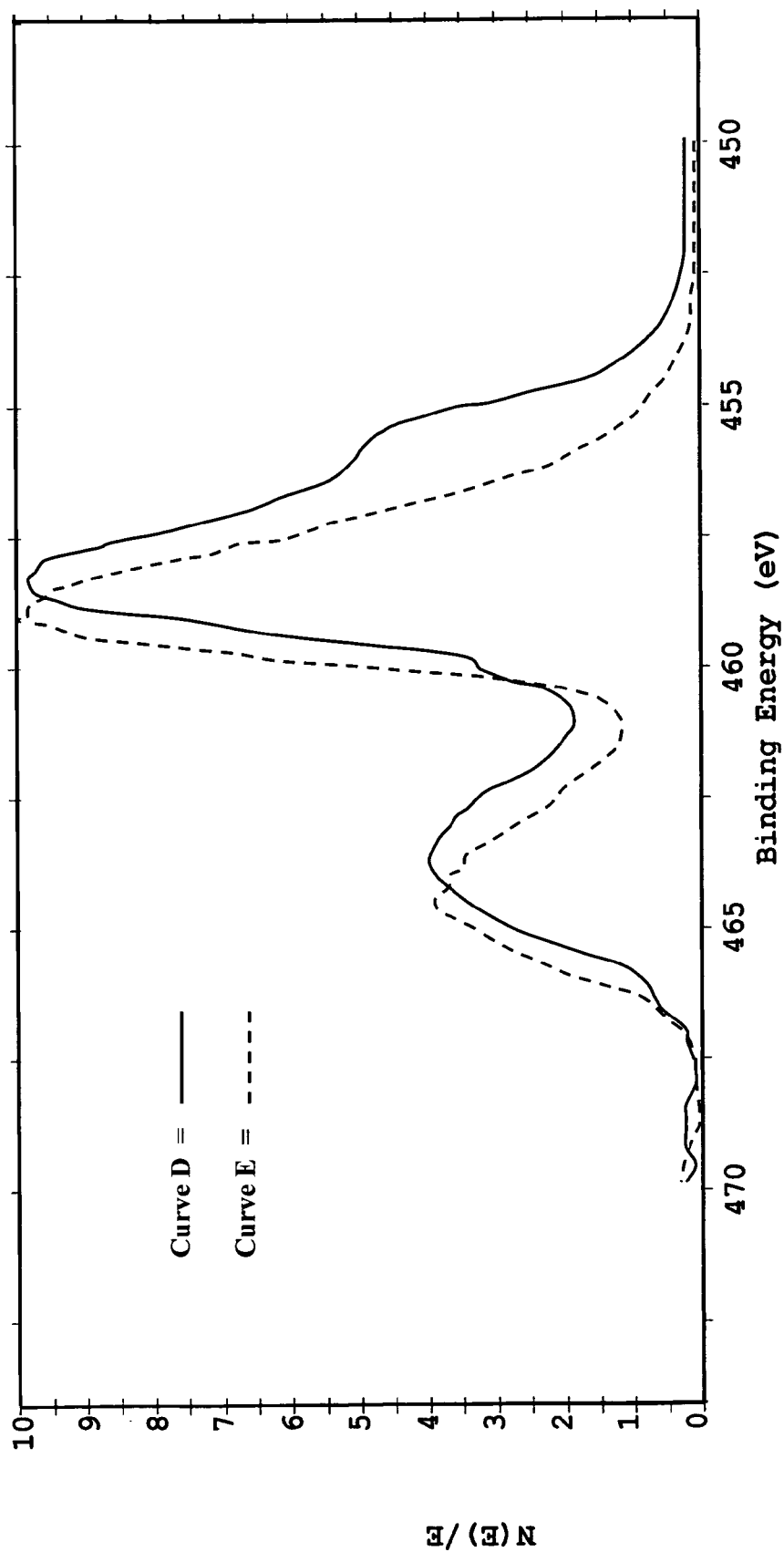
Fig. 3: XPS analysis of catalysts; Curve D = catalyst, Curve E = precursor; Al/Ti = 50/1.

CATALYSTS OF THE ZIEGLER-NATTA TYPE FOR THE (CO)POLYMERIZATION OF OLEFINS WITH A HIGH PRODUCTIVITY

The present invention relates to a catalyst of the Ziegler-Natta type for the (co)polymerization of α-olefins, having a high productivity and thermal stability.

More specifically, the present invention relates to an enhanced catalyst of the Ziegler-Natta type with a high activity and thermal stability, which forms a catalytic system that is particularly effective in high-temperature polymerization and copolymerization processes of α-olefins, especially ethylene, for obtaining high industrial productivities.

It is well-known that α-olefins, and in particular ethylene, can be polymerized in low, medium or high pressure processes with catalysts of the Ziegler-Natta type (ZN) to give substantially linear polymers with high molecular weights. These catalysts generally consist of a compound based on one or more elements of the fourth to sixth groups of the Periodic Table, combined with an organometallic compound or a hydride of the elements of groups 1, 2 or 13 of the Periodic Table, especially an aluminium alkyl. ZN catalysts comprising a solid containing a transition metal (generally titanium), a bivalent metal (generally magnesium), a halogen (generally chlorine), and optionally an electron-donor compound, are particularly known. These solid catalysts, combined with an organometallic compound of aluminium, form catalytic systems active in the polymerization or copolymerization [hereinafter (co)polymerization] of ethylene, in processes carried out at low temperatures and pressures. Patent U.S. Pat. No. 3,642,746, for example, describes a catalytic solid obtained by contact of a compound of a transition metal with the halide of a bivalent metal treated with an electron-donor. According to patent U.S. Pat. No. 4,421,674, the catalyst is obtained by contact of a compound of a transition metal with the spray-drying product of a solution of magnesium chloride in ethanol. According to patent GB 1,401,708, the solid catalyst is obtained by interaction of a magnesium chloride with a non-halogenated compound of a transition metal and an aluminium halide. Patents U.S. Pat. Nos. 3,901,863 and 4,292,200 describe catalysts obtained by putting a non-halogenated magnesium compound in contact with a non-halogenated compound of a transition metal and with an aluminium halide.

Patents U.S. Pat. No. 4,843,049 and EP 243,327 describe a solid catalyst which contains titanium, magnesium, aluminium, chlorine and alkoxyl groups, highly active in (co)polymerization processes of ethylene carried out at a low temperature and pressure, with the suspension technique and in high-pressure and temperature processes in vessel or tubular reactors respectively. These catalytic solids are generally prepared by reacting an active carrier of magnesium chloride obtained by the spray-drying of an ethanol solution thereof, with titanium tetra-alkoxide or titanium tetrachloride and subsequently with an aluminium alkyl chloride.

It is well-known that the (co)polymerization of ethylene at high temperatures (160-260° C.) offers considerable advantages with respect to polymerization processes in suspension at low temperatures (50-90° C.) [Y. V. Kissin, D. L. Beach *J. App. Polym. Sci.* 28, 1171-1182 (1984)]: i) the rapid separation of the polymer from the solvent by the evaporation of the latter when the pressure decreases; ii) the possibility of producing granules of polymer immediately after the molten polymer has been removed from the reactor; iii) exploitation of the reaction heat to sustain the high temperature rather than its removal by cooling; iv) the possibility of using reactors commonly adopted for high-pressure polymerization processes.

It is also known that catalysts suitable for operating under low-temperature conditions provide modest catalytic performances at high temperatures in terms of a lowering of both the catalytic yields and molecular weights and it is consequently not possible to use them as such in high-temperature processes. Furthermore, the residence times in the reactor in these processes are very short (in the order of a few minutes) and they cannot be increased due to the short life of the catalyst caused by very rapid deactivation processes under these conditions. The catalysts used must therefore reach their maximum activity in extremely rapid times and induction times are not tolerated.

Various attempts have been made to overcome some of these drawbacks, for example for improving the properties of the polymers and copolymers of olefins, using catalysts based on mixtures of transition metals. EP 177,189 and EP 146,507, for example, both describe the preparation and use of catalysts of the ZN type consisting of titanium and hafnium for obtaining polyethylene with a wide molecular weight distribution (bimodal). The process for the preparation of these catalysts consists in the introduction of titanium and hafnium in two separate steps. Patent EP 523,785 discloses that the introduction of magnesium-carboxylate and transition metal-carboxylate bonds allow catalytic solids to be obtained, which represent an improvement with respect to the known art in terms of activity in (co)polymerization processes of ethylene and other α-olefins, in processes carried out at low pressure and temperature, at high pressure and temperature and in solution and also in relation to the nature of the polymers obtained. Patent EP 1,171,479 claims a particular bimetallic catalyst of the ZN type, supported on magnesium chloride which allows the production of polymers and (co)polymers of α-olefins with high molecular weights also in high-temperature processes.

Also in the case of this latter catalyst, however, in spite of its enhancing activity with respect to the known art, there is still a rapid degradation of the catalytic performances in terms of yield and certain properties of the polymers obtained, in particular the average molecular weights, at higher temperatures (T>220° C.) and for longer residence times.

It is generally believed that the drop in performances is due to both heat degradation, [J. P. Machon, R. Hermant, J. P. Houzeaux, *J. Polym. Sci.* 52, 107 (1975); J. A. Delgado Oyague, J. L. Hernandez-Vaquero Alvarez, *Plastics and Rubber Processing and Applications* 8, 3 (1987)], and also to the deactivation of the active surface sites of Ti(III) caused by the excessive alkylating power of the aluminium trialkyls at high temperatures [J. P. Machon, R. Hermant, J. P. Houzeaux, *J. Polym. Sci.* 52, 107 (1975)].

The influence of aluminium alkyls on the reduction of titanium is also known [A. Schindler, *Makromol. Chem.* 118, 1 (1968); G. Natta, P. Pino, G. Mazzanti, P. Longi, *Gazz. Chim. It.* 87, 549, (1957); G. Natta, P. Pino, G. Mazzanti, P. Longi, *Gazz. Chim. It.* 87, 570, (1957)]. In particular, the simultaneous alkylation of adjacent Ti(III) sites causes the rapid reduction of Ti(III) to Ti(II)) (D. F. Hoeg—in *The Stereochemistry of Macromolecules*"—Vol. 1, p. 47-Marcel Dekker Inc. New York 1967).

In order to solve the above problems and drawbacks and further improve the production process of polyolefins, the Applicant has now found a new groups of catalysts, obtained by characteristically regulating the variables associated with the formation of solid particles, during the chloro-alkylation reaction, whereby it is possible to obtain much higher catalytic performances with respect to the known art in terms of productivity and stability with time in high-temperature polymerization processes, both in solution and under high pressure.

A first object of the present invention therefore relates to a solid catalyst for the (co)polymerization of α-olefins, comprising titanium, magnesium, aluminium, chlorine and at least one metal selected from hafnium and zirconium, in the following molar ratios:

M/Ti=0.2-5.0; Mg/Ti=3.0-15.0; Al/Ti=0.1-4.0; Cl/Ti=15.0-60.0 wherein M is a metal selected from hafnium and zirconium or a mixture thereof, preferably hafnium, characterized in that at least 60.0, preferably at least 80%, of the titanium is in oxidation state +3 and, when examined via XPS spectroscopy, it has an absorption band characteristic of a binding energy ranging from 454 to 458 eV, preferably centred around the value of 456±1 eV.

The term "(co)polymerization", as used in the present description and claims with reference to α-olefins, refers to both the homo-polymerization of an α-olefin, for example of ethylene to form high-density crystalline polyethylene, or propylene to form polypropylene, and also the (co)polymerization of an α-olefin with at least one different unsaturated compound copolymerizable with it (obviously including a different α-olefin), for example, the co-polymerization of ethylene with ethylidene-norbornene to form a cross-linkable polyethylene, or the co-polymerization of ethylene with 1-butene to form linear low-density polyethylene.

For greater simplicity, in the present description and claims, the terms "mole" and "molar ratio" are used with reference to both compounds consisting of molecules and also with reference to atoms and ions, disregarding for the latter the terms gram-atom or atomic ratio, even if scientifically more correct.

The catalyst according to the present invention is characterized by an XPS spectrum typical of a structure in which a fraction of the surface titanium sites, which interacts with an aluminium alkyl halide compound, presumably with the formation of an adduct whose structure has not yet been determined. On the basis of the ratio between the areas of the characteristic XPS peaks, centred around binding energy values of 456 and 459, respectively, the quantity of these sites can be estimated as being at least 10%, preferably from about 15 to about 40%, of the total number of surface sites of Ti which contribute to the formation of the XPS spectrum, i.e. the Ti atoms included in the surface layer for a depth of 10 nm approximately.

In accordance with this, the surface titanium atoms of the present catalyst, on which it is believed that the catalytically active centres are formed, prevalently (at least 60%) have oxidation state +3, and at least 10% of these is characterized by a greater electronic charge density on the metallic centre and a lower binding energy with respect to the typical peak shown upon XPS by analogous catalysts described in the known art, but obtained with a different process, for example those obtained in accordance with European patent applications EP-A 523,785 and EP-A 1,171,479 mentioned above.

The spectroscopic technique known as XPS (X-ray Photoelectron Spectroscopy) is based on the photoelectric effect, from which the photoelectrons emitted from the surface of the sample irradiated are obtained and analyzed. The analyses are effected in an ultra-high-vacuum environment (UHV=$10^{-9}$ Torr) at room temperature. In order to compensate the positive charge, which is produced on the surface following the photoemission process, the sample is struck by a beam of low-energy electrons (neutralizer). The analysis area is circular with a diameter of 0.8 mm and the sampling depth is only 10 nm approximately. This is a surface analysis, capable of revealing the presence of the most external chemical species. A quantitative response is obtained, relating to the atomic percentage of the most abundant elements, excluding hydrogen. From the spectra of the single elements acquired in high resolution, it is also possible to obtain the single components of a particular chemical element with a different electronic neighbourhood, by measuring the positions of the peaks in terms of binding energy, i.e. dissociation energy of the electrons of the non-excited level with a higher energy, and their widths at half of the peak (FWHM, "full width at half maximum"). Furthermore, the measurement relating to the areas of the components allows qualitative and quantitative information to be obtained on the real electronic situation experimented by the atoms very close to the surface of the catalytic solid, which could otherwise not be revealed with other techniques. A more detailed description of this technique and its use for surface surveys can be found in numerous publications in literature of the field, for example, as described by J. F. Moulder, W. F. Stickle, P. E. Sobol, K. D. Bomben, in "Handbook of X-Ray Photoelectron Spectroscopy", ed. by J. Chastain, Physical Electronics Div. Eden Prairie, Mo. USA (1992).

The catalysts according to the present invention show a lower distribution of surface titanium with respect to that expected on the basis of the atomic composition, whereas the quantity of aluminium atoms is significantly greater, demonstrating the formation of Ti—Al surface adducts.

In particular, the Applicant has found that at least 10%, preferably from 15 to 40% of the titanium surface atoms of said solid catalyst are in an electronic situation with a greater density of electrons on the basis of what can be deduced from the characteristic XPS spectrum, with respect to what is observed in catalytic solids containing Ti and a second metal M of group 4, i.e. Zr, Hf or a mixture thereof, obtained according to the processes of the known art.

A typical XPS spectrum of a solid catalyst according to the present invention is illustrated in FIG. 3 enclosed herewith. As is clearly evident from a comparison with the curve of the XPS spectrum of a solid catalyst obtained according to the disclosure of the published patent application EP 1,171,479, also illustrated in FIG. 3, the catalyst of the present invention has a signal at a binding energy of 456 eV, partially superimposed with respect to the main signal at 459-460 eV, which can be attributed to Ti atoms immersed in a higher electronic density with respect to the others forming the catalytic solid. The area of the band corresponding to the signal of about 456 eV also allows the relative quantity of Ti surface atoms having a neighbourhood with a greater electronic density, to be measured.

Although it is not possible at the moment to formulate any theory which explains these differences and their influence on the behaviour of the respective catalysts, it has been found that the catalysts in accordance with the present invention prove to be extremely advantageous with respect to the catalysts known so far, in terms of both activity and longevity in polymerization processes of α-olefins, and also in terms of the molecular weight of the polymers thus produced, especially in high-temperature processes.

According to a preferred aspect of the present invention, said catalyst is in the form of a granular solid having a narrow Gaussian-type distribution and a high average value of the maximum dimension of the granules forming it, obtained by controlling the preparation conditions of the solid precursor of the catalyst, as is described in greater detail hereunder. In particular, the granules of catalyst particles have an average diameter ranging from 2 to 15μm, preferably from 3 to 12μm, and a distribution for which 80% of the particles have dimensions within a range of 1 to 30 μm, preferably from 2 to 20μm. It has also been found that the density of the solid catalyst is greater with respect to what has been previously obtained for catalysts of the same group. Thanks to this morphology and properties, it is possible to advantageously effect the preparation of the catalyst with greater rapidity and separation efficacy of the solid obtained in suspension of the liquid reaction or washing medium. Furthermore, when the catalyst is obtained in the form of a suspension in a hydrocarbon medium (for example decane), it is possible to prepare more concentrated suspensions with reasonable decanting times, thus significantly reducing transportation and storage costs of the barrels in an industrial plant.

According to a preferred aspect of the present invention, said solid catalyst is composed for at least 85% by weight, preferably from 90 to 100%, more preferably from 95 to 100% by weight, of titanium, magnesium, said metal M, aluminium and chlorine. In addition to these elements, the catalyst can contain smaller amounts of other constituents, it being possible for there to be the presence of up to 15% by weight, preferably up to 10% by weight, more preferably less than 5% by weight, of a non-metallic residue, normally deriving from counter-anions of the compounds used as reagents, for example, alcoholates, bromide, fluoride, phosphate groups, alkyl residues, and especially carboxylates, without causing any particular disadvantage. On the basis of analytic results, it has been found in particular that said non-metallic residue is prevalently (>=50% by weight) composed of carboxylate anions introduced with the solubilization treatment with carboxylic acids during the preparation of the catalyst, as described hereunder. It is also possible to have the presence, preferably not higher than 0.5% by weight, of impurities of other metals present in the reagents used for the preparation of the solid catalyst or its precursor, without significantly modifying the advantageous properties of the same. Catalysts having the smallest possible amount of impurities of other metals, particularly not higher than 0.1% by weight, are preferable however.

The quantity of titanium contained in the catalyst of the present invention preferably does not exceed 10% by weight, and more preferably ranges from 1 to 5% by weight. Titanium contents higher than 10% by weight do not offer any further advantage in terms of catalytic activity, presumably due to the fact that the additional titanium is present in the solid in inactive form or unavailable for interacting with the olefin to be polymerized.

In a preferred embodiment of the present invention, the different constituents are present in the catalyst in atomic ratios with respect to the titanium within the following ranges:

M/Ti=0.5-4.0; Mg/Ti=6.0-13.0; Al/Ti=0.2-2.0; Cl/Ti=18.0-50.0

As already specified, an original and simple process has been found for the preparation of the above catalyst, substantially comprising four steps. In accordance with this, a second aspect of the present invention relates to a process for the preparation of a solid catalyst for the (co)polymerization of α-olefins, comprising titanium, magnesium, aluminium, chlorine and at least one metal M selected from hafnium and zirconium, in the following molar ratios:
M/Ti=0.2-5.0; Mg/Ti=3.0-15.0; Al/Ti=0.1-4.0; Cl/Ti=15.0-60.0
wherein: M is a metal selected from hafnium and zirconium or a mixture thereof, preferably hafnium, comprising the following steps:

(i) preparing a mixture of at least one magnesium chloride, a titanium compound, a compound of a metal M as defined above, and a carboxylic acid R—COOH, wherein R is an organic group having from 2 to 30, preferably from 5 to 15 carbon atoms, in such quantities as to respect the following molar or atomic ratios:
M/Ti=0.2-5.0; Mg/Ti=3.0-20.0; R—COOH/(Mg+M)=1.5-8 in a hydrocarbon liquid medium, wherein at least one of said metal compounds, preferably at least magnesium chloride, is substantially insoluble as such;

(ii) maintaining the mixture prepared in step (i) at a temperature ranging from 50 to 200° C., preferably from 60 to 130° C. for at least one minute, preferably for a time of 0.5 to 4 hours, in a closed container, and filtering the possible undissolved residue to obtain a solution;

(iii) adding to the solution obtained in step (ii), cooled to a temperature ranging from 20 to 40° C., an aluminium alkyl chloride having the following general formula (I)

$$AlR'_n Cl_{(3-n)} \qquad (I)$$

wherein R' is a linear or branched alkyl radical, containing from 1 to 20 carbon atoms and "n" is a decimal number having values ranging from 0.5 to 2.5, preferably from 0.9 to 2.1; at least in a quantity which is sufficient for precipitating, in the form of solid compound, 70%, preferably 80%, of the metals Mg, M and Ti present in the solution of said step (ii), preferably operating so that the temperature of the reaction mixture does not exceed 45° C. and the difference between the maximum temperature and minimum temperature of the mixture during the addition is equal to or lower than 15° C., to obtain a suspension;

(iv) heating the suspension obtained in step (iii) to a temperature ranging from 50 to 130° C., preferably from 70 to 110° C., for a time of 5 to 180 minutes, preferably from 40 to 150 minutes, in order to complete the precipitation of the solid, and separating the solid compound precipitated from the reaction liquid, to obtain a solid precursor of said catalyst;

(v) treating said solid precursor with a further quantity of aluminium alkyl chloride having formula (I), the same or different from that added in said step (iii), with an Al/Ti ratio higher than or equal to 5, preferably ranging from 10 to 200, more preferably from 20 to 150, at a temperature ranging from −10 to 120° C., preferably from 10 to 50° C., and separating the catalyst thus obtained from the reaction liquid.

The term "substantially insoluble" as used in the present invention and claims, with reference to the mixture of a compound in a liquid, means that over 80% of said compound remains separated in a phase immiscible with said liquid.

The term "(co)polymerization", as used in the present description and claims, with reference to α-olefins, refers to both the homo-polymerization of an α-olefin, for example of ethylene to form high-density crystalline polyethylene, or propylene to form polypropylene, and also the (co)polymerization of an α-olefin with at least one different unsaturated compound copolymerizable with it (obviously including a different α-olefin), for example, the co-polymerization of ethylene with ethylidene-norbornene to form a cross-linkable polyethylene, or the co-polymerization of ethylene with 1-butene to form linear low-density polyethylene.

For greater simplicity, in the present description and claims, the terms "mole" and "molar ratio" are used with reference to both compounds consisting of molecules and also with reference to atoms and ions, disregarding for the latter the terms gram-atom or atomic ratio, even if scientifically more correct.

The liquid medium used for preparing the mixture in step (i) of the process, can be any aliphatic or aromatic hydrocarbon in the liquid state at the temperatures at which said step (i) is carried out. For this purpose, aliphatic or cycloaliphatic hydrocarbons, such as for example, hexane, heptane, octane, nonane, decane, undecane, dodecane, cyclohexane, decalin, tetralin, mixtures of naphthenes with a boiling point ranging from 90 to 150° C. Limited quantities of polar organic liquids such as alcohols, ethers, ketones, however, can also be present in the reaction mixture, possibly deriving from the same precursor compounds added in a mixture, for example alcohols or ethers present in the magnesium chloride obtained according to the known spray-drying methods.

In step (i), a mixture is prepared in an inert hydrocarbon liquid, comprising carboxylic acid and the precursor compounds of the metals titanium, magnesium, hafnium and/or zirconium contained in the catalyst obtained at the end of the process. These compounds can be selected from a wide range of known organometallic and inorganic compounds of said metals, either soluble or insoluble in the liquid hydrocarbon preselected. At least one of these compounds, preferably at least two and more preferably the compounds of magnesium, hafnium and/or zirconium, are insoluble in said inert liquid. All the precursor compounds of the metals forming the mixture can also be insoluble in the inert liquid selected for step (i). In a particularly preferred embodiment, at least 50% by weight, with respect to the total weight, of the above compounds is insoluble in the inert liquid preselected. These compounds are preferably mixed with the inert liquid with an overall concentration of the metals (both soluble and insoluble), ranging from 0.05 to 3.0, more preferably ranging from 0.1 to 1.0 moles/l. The order with which these compounds are introduced into the mixture with each other and with the inert liquid is not particularly critical for the purposes of the present invention, but the carboxylic acid is preferably added last.

The compounds of titanium, magnesium, hafnium and zirconium are suitably selected by an expert in the field from those suitable for being partially dissolved in the reaction of the subsequent step (ii). The selection of the most suitable compounds for the purpose can be effected on the basis of the solubility parameters of each compound, if known, or with solubility tests in the presence of the carboxylic acid selected. Non-limiting examples of suitable compounds of titanium, hafnium and zirconium, both soluble and insoluble, are chlorides, bromides, alcoholates, hydrides, $\beta$-diketonates, $\beta$-acylesters, amides, carbonates, carboxylates, phosphates, compounds mixed with said counter-ions and mixtures of said groups of compounds.

Particularly preferred are halides, especially chlorides, and halides combined with alcoholates. Magnesium chlorides suitable for the present invention can be the various crystalline or amorphous forms of $MgCl_2$, preferably in powder or fine granular form (average dimension <500 μm), comprising the magnesium chlorides obtained by rapid evaporation according to the known techniques, for example by spray-drying, of concentrated ethanol solutions. Other chlorides included within the scope of the present invention are mixed magnesium chlorides, in which there is at least one chlorine atom per Mg atom, and the remaining counter-ions can be other halogens, for example Br or F, or an alcoholate group, for example, ethylate, or another organic or inorganic anion. The titanium is preferably introduced into the mixture as a tetravalent ion, i.e. as a compound of Ti(IV).

In a preferred embodiment of the present invention, magnesium, hafnium and/or zirconium are introduced into the mixture of step (i) as chlorides in the form of granular solids or powder. Particular suitable titanium compounds, in addition to chlorides and mixed chlorides, are alcoholates such as Ti tetraethylate or tetrabutylate.

The mixture of step (i) can be prepared by the simple introduction, under stirring, into the inert liquid, of the metallic compounds and carboxylic acid, the former preferably in granular or powder form. The carboxylic acid is preferably introduced after the metallic compounds to facilitate the control of possible partial reactions already at the moment of mixing. The temperature during the formation of the mixture is conveniently maintained at a value lower than or equal to 40° C. Normal temperature and pressure conditions are evidently preferred for a greater operative simplicity of the process. Effecting step (i) under conditions which are such as to produce a partial reaction of the reagents, however, is not excluded from the scope of the present invention. In a possible embodiment, especially on an industrial scale, step (i) and the subsequent step (ii) can be carried out without a solution of continuity, feeding the reagents in the same equipment in which they are to react with each other, which is kept closed and under such temperature conditions as to trigger the reaction with carboxylic acid right from its introduction into the hydrocarbon liquid mixed with the metallic compounds. In a particular embodiment of the present invention, one or more additional portions of carboxylic acid can be introduced into the reagent mixture also during step (ii).

Any other method for the formation of the mixture of these compounds is in any case included in the scope of the present invention.

The various metallic compounds of step (i) are introduced in a mixture in molar ratios selected in relation to the atomic ratios desired between the corresponding elements in the solid obtained at the end of the process. These atomic ratios are not necessarily identical to those of the metals in the corresponding compounds in step (i), as shifts are possible, according to the process of the present invention, in relation to the specific conditions adopted, especially as a result of the lower quantities of compounds remaining undissolved and separated at the end of step (ii) or which have not precipitated in step (iii) or (iv), which can normally reach 30% more or less, without significantly jeopardizing the expected properties of the solid catalyst obtained at the end of the preparation process. An expert in the field is capable, in the usual preliminary preparation operations of the process, of verifying the entity of these shifts and consequently optimizing the ratios of the reagents in relation to the atomic ratios desired between the elements in the final product. Preferred atomic ratios between the elements in step (i) of the process of the present invention are the following:
M/Ti=0.5-4.0; Mg/Ti=3.0-16.0; R—COOH/(Mg+M)=2.0-4.5

The carboxylic acid having the formula RCOOH used in step (i) for the partial or complete dissolution of the solids present therein, preferably has a relatively high number of carbon atoms in the chain, ranging from 5 to 15, to favour dissolution in a liquid medium of the hydrocarbon type. Carboxylic acids with a number of carbon atoms higher than 31 are difficult to find on the market and do not offer particular advantages with respect to those having up to 30 atoms in the chain. The group R in the formula of carboxylic acid can be any hydrocarbon radical having up to 30 carbon atoms, including hydrocarbon radicals substituted with inert groups, especially halogens such as fluorine and chlorine. More preferably, it is an aliphatic or cycloaliphatic radical having from 6 to 12 carbon atoms.

Non-limiting examples of said group R according to the present invention are:
  a linear alkyl containing at least 5 carbon atoms; for example the groups n-hexyl, n-octyl, n-decyl, n-undecyl;
  a branched alkyl which can be represented by the following general formula:

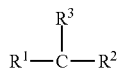

wherein $R^1$ is hydrogen or alkyl and $R^2$ and $R^3$ are alkyl, wherein the sum of the carbon atoms is equal to at least 4 and up to 12; for example isoamyl, 1-ethylhexyl groups, branched aliphatic radicals of versatic acids;
  an alkyl carrying a branching on the secondary carbon atom in □ □ □ with respect to the carbon atom of the carboxyl and having from 4 to 12 carbon atoms; for example in 3-ethyl pentanoic and citronellic acid;
  a cycloalkyl, aryl, alkylcycloalkyl or alkylaryl having the general formula:

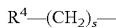

wherein $R^4$ represents the cycloalkyl or aryl portion, having from 5 to 10 carbon atoms, for example the cyclhexyl, benzyl, phenyl, p-ethylphenyl group and "s" is an integer varying from 0 to 10.

Mixtures of acids having different R groups containing from 2 to 30 carbon atoms, according to what is defined above, are also equally included in the definition of carboxylic acid R—COOH according to the present invention.

The carboxylic acid can be added in portions or in continuous to the heterogeneous mixture of step (i), or it can be added all together in the pre-established quantity for effecting the partial dissolution up to the desired percentage. The amount of carboxylic acid depends, each time, on the nature and quantity of insoluble compounds present in the mixture of step (i), and also on the quantity of insoluble residue which an expert can consider tolerable at the end of step (ii). The latter is suitably lower than 30%, preferably equal to or lower than 10%, by weight with respect to the weight of the initial insoluble product. The molar ratio RCOOH/(Mg+M) preferably ranges from 2.0 to 5.0, more preferably from 2.5 to 4.0.

An overall quantity in moles of carboxylic acid ranging from 1 to 3 times, more preferably from 1.5 to times, the equivalents of insoluble compounds, is preferably introduced during step (i). If, for example, in the mixture of step (i) 20 moles of $MgCl_2$ and 3 moles of $HfCl_4$, both insoluble, and 2 moles of titanium tetrabutylate, soluble, are present in decane, the quantity of carboxylic acid (for example versatic acid) is preferably selected from 52 to 156 moles, more preferably from 78 to 104 moles.

The above carboxylic acid can be added to the mixture in pure form, or diluted with an inert solvent, preferably the same liquid as the mixture of step (i), for example to favour the mixing in the case of solid acid, or for a more accurate dosage when small quantities are used.

Step (ii) of the process of the present invention is preferably carried out at a temperature higher than room temperature to favour a rapid dissolution of the solids present in the mixture. The dissolution temperature preferably ranges from 60 to 130° C., more preferably from 70 to 110° C. A possible cooling of the mixture after the partial dissolution of the insoluble compounds is included in the process operations within the scope of step (ii).

During step (ii), a mixture is formed in which the carboxylic acid is at least partly combined with the metallic compounds present forming mixed carboxylates in solution. The residual solid which can possibly remain undissolved at the end, can contain one or more of the metals initially introduced in step (i). When the magnesium compound in step (i) is $MgCl_2$, it has been found that this residue, if present, substantially consists of magnesium chloride.

More advantageously, the overall quantity of compounds remaining undissolved in the mixture at the end of step (ii) is at the most equal to 30%, preferably not higher than 10% by weight with respect to the total weight of the initial insoluble product. In this way, an excellent combination of factors is obtained, which allow a solid catalyst to be prepared, with high performances, a reduced consumption of carboxylic acid and aluminium alkyl chloride.

Step (ii) is preferably carried out so that there are no significant losses of material externally, for example in a closed container or under reflux conditions of the solvent. If hydrochloric acid develops during the reaction, due to the presence of chlorides in the above metals, this consequently remains dissolved in the reaction mixture.

At the end of step (ii), the residual solid possibly present can be conveniently separated from the liquid before the latter is treated with an aluminium alkyl chloride with the subsequent step (iii). The separation can be effected, preferably after cooling the mixture to a temperature ranging from 20 to 40° C., by any of the known techniques suitable for the purpose, such as for example, filtration, decanting, centrifugation. In a preferred embodiment, the possible separation of the insoluble residue is effected in suitable closed containers, maintaining the pressure and temperature at such values as to limit the release of vapours as much as possible.

In step (iii) of the process for preparing the catalyst according to the present invention, an aluminium alkyl chloride having formula (I) is reacted with a solution obtained in accordance with the previous step (ii), possibly after separation of the undissolved solid, in order to form a suspension of a solid which is spontaneously separated from the liquid medium as a granular precipitate. According to the experience of the Applicant, a suspended solid is formed during step (iii), prevalently consisting of Mg and M (preferably Hf) chlorides, whereas the titanium prevalently precipitates during the subsequent step (iv), prevalently in the form of $TiCl_3$ In this way, a catalyst precursor is obtained, having a high activity and an optimum particle-size, in addition to showing an improved stability in the polymerization process, within a wide temperature range.

The use of an aluminium alkyl chloride having formula (I) as precipitant reagent allows the contemporaneous precipitation of the elements Mg and M in the form of mixed chlorides, or mixed chlorides-carboxylates, in addition to the reduction and precipitation of the titanium, mainly in step (iv), so that this is prevalently present in the solid catalyst precursor in oxidation state +3.

Aluminium alkyl chlorides having formula (I) are known and widely used in the field of the polymerization of olefins. Preferred aluminium alkyl chlorides are compounds having formula (I) wherein R' is a linear or branched aliphatic radical having from 2 to 8 carbon atoms. The deponent "n" in formula (I) preferably ranges from 0.9 to 2.1, more preferably from to 2, extremes included. Typical examples of these compounds are ethyl aluminium dichloride, diethyl aluminium chloride, ethyl aluminium sesquichloride, isobutyl aluminium dichloride, dioctyl aluminium chloride. Aluminium alkyl chlorides having non-integer decimal values "n" can be obtained, according to the known art, by mixing, in suitable proportions, aluminium chlorides and aluminium trialkyls and/or the respective mixed alkyl chlorides having "n" equal to 1 and 2.

The aluminium alkyl chloride having formula (I) can be added as such, or, preferably, in the form of a solution in an inert organic solvent selected from those used for the preparation of the mixture of step (i). The addition of the aluminium alkyl chloride can be effected by maintaining the reaction mixture under stirring under suitable temperature conditions and monitoring the precipitation of the solid in suspension according to any of the known techniques, for example, by collecting samples and analysis, or by direct determination with optical methods or other methods suitable for the purpose, until the desired precipitation level is reached.

According to a preferred embodiment, an expert in the field can predetermine with normal routine tests, for each specific composition of the solution of step (ii), the amount of aluminium alkyl chloride which is sufficient for quantitatively precipitating the metals Mg, M and Ti during steps (iii) and (iv) of the process of the present invention. It has also been found, on the basis of repeated experiences, that the amount of aluminium alkyl chloride which is generally adequate for obtaining the desired precipitation in steps (iii) and (iv) according to the present invention, with the formation of the desired precursor, is at least equal to the double, preferably from 3 to 5 times, of the moles of carboxylic acid used in step (ii). More preferably, the amount of aluminium alkyl chloride which is added in step (iii) ranges from 1.2 to 2 times that calculated according to the formula:

$$(AlR'_nCl_{(3-n)}\ moles)=1/(3-n)\cdot[(4\cdot Ti\ moles+2\cdot Mg\ moles+4\cdot M\ moles-Cl\ moles)_{in\ step\ (i)}+2\ (RCOOH\ moles)_{in\ step\ (ii)}].$$

Higher quantities of aluminium alkyl chloride do not further improve the properties of the catalyst, but cause an excessive consumption of aluminium alkyl and lead to the necessity of repeated washings of the precipitate. This calculation method is particularly preferred when the compounds used in step (i) are essentially selected form alcoholates and chlorides, which are usually commercial products easily available on the market.

In step (iii), it is convenient to operate at a temperature ranging from 20 to 45° C. for at time which, depending on the temperature pre-selected, can vary from 0.5 to 8 hours. In a preferred embodiment, the aluminium alkyl chloride is added to the solution coming from step (ii) operating so that the difference between the minimum and maximum temperature in the addition phase does not exceed 15° C. This can be obtained by controlling the addition rate or flow of the aluminium alkyl chloride (or a solution thereof in a hydrocarbon solvent) to the solution, so that the heat developed by the reaction can be adequately removed or absorbed, for example with exchangers or cooling jackets.

In accordance with step (iv) of the preparation process, after the addition of the aluminium alkyl chloride, the suspension obtained is heated and maintained at a temperature ranging from 50 to 130° C., more preferably from 70 to 110° C., for a time of 5 to 180 minutes, preferably from 40 to 150 minutes, to consolidate the solid obtained. The heating phase and temperature maintaining of step (iv) is effected in a closed vessel, at the equilibrium pressure reached by the system, which normally ranges from 100 to 500 KPa.

An expert in the field can optionally effect the present preparation process by adding a part, preferably up to 30% with respect to the total, of aluminium alkyl chloride before starting the heating of step (iv).

By operating under the above conditions, the precursor is obtained in the form of a solid precipitate or in powder form, whose particles typically have a relatively narrow Gaussian distribution, with an average diameter ranging from 2 to 15 µm, preferably from 3 to 12 µl and a distribution of the particle dimensions having 80% of the particles within a range of 1 to 30 µm, preferably from 2 to 20 µm. This represents a further advantageous aspect of the preparation process of the catalyst of the present invention, as it allows a precursor to be obtained at the end of step (iv), with an average dimension of the granules and distribution ideal for an optimum separation of the mother liquor and subsequent washing, and also for effecting the subsequent operations, transportation and storage of the solids obtained.

The solid catalyst precursor thus obtained is separated from the reaction liquid (containing residues of aluminium alkyl, carboxylate and other impurities) usually with the normal liquid-solid separation means, excluding evaporation of the solvent, which would leave traces of undesired residues in the product obtained. Decanting, filtration or centrifugation can be typically used, or a combination of these methods, preferably effecting intermediate washings with a hydrocarbon solvent, until a level of aluminium lower than 1.5 mM/L, more preferably 1 mM/L is obtained in the liquid separated. A particularly preferred separation method consists of one or more decanting steps followed by one or more filtration steps and washing with hydrocarbons. For this purpose, the solid precursor is left to settle up to a volume of the suspension lower than 50%, preferably 30%, of the initial volume, with a concentration of the solid of 200 g/L. The clarified liquid in the upper part is removed and the suspension brought back to a volume similar to the initial value or even greater, by adding the necessary amount of a liquid hydrocarbon, the same or different from that of the reaction. The sedimentation and separation steps as described above are possibly repeated once or twice, subsequently proceeding with the filtration of the granular solid and effecting consecutive washings with hydrocarbons until the desired threshold of aluminium impurities is reached in the washing solvent. In this process, it is particularly advantageous to avail of a solid precursor with a high particle-size, according to one of the preferred aspects of the present invention, for conveniently effecting the sedimentation operations.

The catalyst precursor obtained at the end of step (iii) is in itself a granular solid active in the (co)polymerization of alpha-olefins combined with a co-catalyst consisting of an aluminium alkyl, and therefore represents a further object of the present invention. Said solid catalyst precursor for the (co)polymerization of α-olefins, comprises titanium, magnesium, at least one metal M selected from hafnium and zirconium, preferably hafnium, aluminium and chlorine, in the following molar ratio ranges:
M/Ti=0.2-5.0; Mg/Ti=3.0-15.0; Al/Ti=0.1-3.0; Cl/Ti=20.0-60.0
characterized in that at least 60%, preferably at least 80%, of the titanium is in oxidation state +3, and has a particle-size with a narrow Gaussian distribution having a maximum of 2 to 15 µm, preferably from 3 to 12 µm, and dimensions of the granules which are such that 80% by weight of the same is within the range of 1 to preferably from 2 to 20 µm. The density of said precursor, measured by means of a Pascal porosimeter, is preferably higher than 1.8 g/cm$^3$, ranging from 2.0 to 3.0 g/cm$^3$.

Analogously to the final catalyst, up to 15%, preferably up to 10%, more preferably up to 6%, by weight of the precursor consists of an organic residue prevalently containing carboxylate.

Said precursor can be obtained, at the end of the above step (iv), in dry granular form, and possibly preserved in an inert atmosphere for subsequent uses, or, preferably, it is obtained in the form of a concentrated suspension (slurry) in a hydrocarbon solvent, preferably the same solvent as the last washing, at the end of the separation process by decanting, and thus preserved or immediately fed to step (v) of the process for the preparation of the catalyst. The precursor in slurry conveniently has concentrations ranging from 150 to 500 g/l, suspended in aliphatic hydrocarbons having from 6 to 14, preferably from 8 to 12, carbon atoms. The improved morphology and greater density of the precursor obtained under the preferred controlled temperature conditions of step (iii), allow said concentrated suspensions by decanting in times of a few hours.

In step (v) of the present process for the preparation of the catalyst, said solid precursor is reacted in a suspension of a liquid hydrocarbon, preferably as indicated above, with a further quantity of an aluminium alkyl chloride selected from those included in the previous formula (I). The contact time between the aluminium and solid precursor is not particularly critical, as the reaction is already sufficiently rapid at room temperature. The reagent mixture is conveniently left under stirring for a time of 1 to 120 minutes, preferably from 10 to 60 minutes, with suitably shorter times with an increase in the reaction temperature selected. If a reaction temperature higher than 80° C. and up to 150° C. is used, however, the treatment times with aluminium alkyl chloride are preferably reduced by 1 to 15 minutes in order to avoid undesired reactions. It has been found that the solid thus obtained substantially has the same morphology and particle distribution as the corresponding solid precursor obtained at the end of step (iv).

The catalyst thus produced is then separated from the reaction liquid containing the excess of alkyl aluminium chloride, by means of one of the methods described in the previous step (iv), preferably by decanting and/or filtration, possibly followed by washing steps with a solvent. At the end, the catalyst can be maintained in the form of a concentrated suspension, analogously to what is specified above for the precursor, or it can be obtained in the form of a dry product by evaporation of the residual liquid.

All the process operations previously described, especially those relating to steps (iii) onwards, are conveniently carried out in a controlled and inert atmosphere, for example of nitrogen or argon, considering the sensitivity of the aluminium alkyls, precursor and catalytic solid to the air and humidity.

The catalyst obtained at the end of the process according to the present invention therefore comprises at least two metals of group 4 of the periodic table, and for this reason it is conventionally indicated with the term "bimetallic". It can be put in contact with a co-catalyst selected from hydrides or organometallic compounds of metals of groups 1, 2 or 13 of the periodic table, according to the known preparation techniques of polymerization catalysts of the Ziegler-Natta type, for obtaining a catalytic system for the (co)polymerization of α-olefins, and particularly ethylene, having a high activity and selectivity, in addition to a prolonged operative duration especially in high-temperature processes.

In accordance with the present invention, in addition to the above-mentioned titanium, magnesium, zirconium, hafnium, aluminium and chlorine, said solid catalyst can comprise up to 15%, preferably up to 10%, more preferably less than 5% by weight, of a residue composed of other constituents. It has been verified that this residue prevalently consists of carboxylate coming from the treatment with carboxylic acid RCOOH in step (ii) of the preparation process of the catalyst. Smaller quantities of groups or anions deriving from the other compounds used as reagents in the preparation process, for example, alcoholates, bromine, phosphate groups, fluorine, etc. can also be present, without causing any particular disadvantage. The presence, preferably not higher than 0.5% by weight, of impurities of other metals present in the reagents used in the preparation of the catalyst, is also possible, without significantly modifying the advantageous properties of the same.

The quantity of titanium contained in the catalyst of the present invention preferably does not exceed 10% by weight and more preferably ranges from 1 to 5% by weight. Titanium contents higher than 10% by weight do not offer any further advantage in terms of catalytic activity, presumably due to the fact that the additional titanium is present in the solid in inactive form or unavailable for interacting with the olefin to be polymerized.

In a preferred embodiment of the process according to the present invention, the solid catalyst obtained at the end of this process has the following composition (atomic or molar) ratios:
M/Ti=0.5-4.0; Mg/Ti=6.0-13.0; Al/Ti=0.2-2.0 Cl/Ti=18.0-50.0,
and is composed for at least 90% by weight of the above atoms or ions.

At least 60% of the titanium contained in the catalyst obtained with the present process is present in reduced form (oxidation state +3). The titanium in reduced form is preferably at least 80% of the total titanium, more preferably 90%. The quantity of +3 titanium in the catalyst is advantageously as high as possible and generally increases with an increase in the quantity of aluminium alkyl chloride having formula (I) introduced in the above step (iii) and subsequent step (v).

Solid catalysts can be prepared with the process described above, according to the present claim 1. The Applicant has found that these new catalysts are characterized by a different surface distribution of the active metals, such as titanium and hafnium or zirconium, with respect to analogous catalysts of the known art, and allow very high yields to be obtained from the very start of the polymerization in (co)polymerization processes carried out at temperatures ranging from 160 to 260° C., in addition to providing high productivities thanks to their longer duration (i.e. deactivation in longer times) in high-temperature polymerizations.

Suitable co-catalysts which can be used in a combination with the catalyst of the present invention in (co)polymerization processes of olefins, are those normally described in the art for the preparation of catalysts of the Ziegler-Natta type and previously mentioned. Preferred co-catalysts are aluminium trialkyls and halides (particularly chloride) of aluminium alkyl containing from 1 to 10, preferably from 2 to 6, carbon atoms in each alkyl radical bound to Al. Among these, aluminium trialkyls such as aluminium triethyl, aluminium tri-n-butyl, aluminium triisobutyl and aluminium trihexyl are particularly preferred.

The Applicant has also found (and this forms a further advantage of the present invention with respect to the known art) that excellent results in (co)polymerization processes can be obtained by combining the catalyst of the present invention with an alkyl aluminoxane. Suitable aluminoxanes are compounds of aluminium alkyl containing Al—O—Al bonds, with a varying O/Al ratio, which can be obtained in the art by reaction, under controlled conditions, of an aluminium alkyl with water or other compounds containing predetermined quantities of available water, such as, for example, in the case of the reaction of aluminium trimethyl with aluminium sulfate hexahydrate, copper sulfate pentahydrate or iron sulfate pentahydrate. The alkyl aluminoxanes which are preferably used in a combination with the catalyst of the present invention are oligo- or polymeric compounds, cyclic and/or linear, characterized by the presence of repetitive units having the following formula (II):

(II)

in cui $R_5$ is a $C_1$-$C_6$ alkyl group, preferably methyl.

Each molecule of aluminoxane preferably contains from 4 to 70 repetitive units which may also not be equal to each other, but contain different $R_5$ groups.

Said aluminoxanes, and particularly methyl aluminoxane (MAO) are compounds which can be obtained with known organometallic chemical processes, for example by the addition of aluminium trimethyl to a suspension in hexane of aluminium sulfate hydrate.

In the catalysts of the present invention, the atomic ratio between aluminium (in the co-catalyst) and titanium (in the catalyst) generally ranges from 5:1 to 1,000:1 and preferably from 20:1 to 500:1, in relation to the type of co-catalyst and particular polymerization process adopted.

Said (co)polymerization catalytic system is formed according to the known methods, by contact between the solid catalyst and the co-catalyst, preferably in a suitable liquid medium, usually a hydrocarbon, which can also consist of, or contain, one or more of the olefins to be polymerized. Depending on the characteristics of the polymerization process in which the catalyst obtained according to the present invention is to be used, the catalyst/co-catalyst catalytic system can be prepared separately and subsequently introduced into the polymerization reactor, or it can be prepared in situ, by feeding the constituents separately into the reactor. The temperature at which said constituents are put in contact for the formation of the catalytic system is not particularly critical and can vary within a wide range, preferably from 0° C. to the temperature of use in the polymerization process. The formation of the catalytic system is normally almost immediate already at room temperature, although, in certain cases, contact between the components can be maintained from 10 seconds to 30 minutes, depending on the temperature, before initiating the polymerization.

One or more additives or further components can possibly be added to the above catalyst according to the present invention, to obtain a catalytic system suitable for satisfying specific requisites in practice, analogously with what is known in the art. The catalytic systems thus obtained should be considered as being included in the scope of the present invention. Additives or components which can be included in the preparation and/or formulation of the catalyst of the present invention are inert liquids, such as, for example, aliphatic and/or aromatic hydrocarbons, suitable for maintaining the catalyst in suspension, in addition to small quantities of weakly coordinating additives (Lewis bases) selected, for example, from non-polymerizable olefins, ethers, tertiary amines and alcohols, other halogenating agents such as halogenated hydrocarbons, preferably chlorinates, and again all other possible components normally used in the art for the preparation of traditional catalysts for the (co)polymerization of ethylene and other α-olefins.

The catalyst described above can be advantageously used in all the known (co)polymerization processes of α-olefins, both in continuous and batchwise, in one or more steps, such as, for example, low-pressure (0.1-1.0 MPa), medium-pressure (1.0-10 MPa) or high-pressure (10-150 MPa) processes, at temperatures ranging from 20 to 300° C., optionally in the presence of an inert diluent. Hydrogen can be conveniently used as molecular-weight regulator.

These processes can be carried out in solution or suspension in a liquid diluent normally consisting of saturated aliphatic or cycloaliphatic hydrocarbons having from 3 to 12, preferably from 60 to 10, carbon atoms, but which can also consist of a monomer, such as for example, in the known copolymerization process of ethylene and propylene in liquid propylene. The quantity of catalyst introduced into the polymerization mixture is preferably selected so that the concentration of titanium is within the range of $10^{-4}$ to $10^{-8}$ moles/litre.

The α-olefins which can be used in the above processes are preferably those containing from 2 to 20, more preferably from 2 to 8, carbon atoms, aliphatic, cycloaliphatic or aromatic, such as ethylene, propy-lene, 1-butene, 4-methylpent-1-ene, 1-hexene and 1-octene, ethylidene norbornene, styrene. Ethylene is particularly preferred, with reference to both homo-polymerization and also co-polymerization processes, in which ethylene is in any case the prevalent monomer as it represents over 50% by weight of the polymer obtained.

In particular, the catalyst of the present invention can be used in the preparation of polymers and copolymers of ethylene with a surprisingly narrow molecular weight distribution with respect to those normally obtained in polymerization processes with bimetallic catalysts. It can be used with excellent results in the polymerization of ethylene to give linear polyethylene and in the copolymerization of ethylene with propylene or higher α-olefins, preferably having from 4 to 10 carbon atoms, to give copolymers having different characteristics in relation to the specific polymerization conditions and quantity and structure of the same α-olefin. Linear polyethylenes with densities ranging from 0.880 to 0.950, can be obtained for example, and with average molecular weights ranging from 100,000 to 2,000,000 The α-olefins preferably used as co-monomers of ethylene in the production of low or medium density linear polyethylene (known with the abbreviations ULDPE, VLDPE and LLDPE, depending on the density), are 1-butene, 1-hexene and 1 octene.

The catalyst of the present invention can also be conveniently used in copolymerization processes of ethylene and propylene to give saturated vulcanizable elastomeric copolymers with the use of peroxides, extremely resistant to aging and degradation, or in the terpolymerization of ethylene, propylene and a non-conjugated diene having from 5 to 20 carbon atoms, to obtain vulcanizable rubbers of the EPDM type.

Examples of non-conjugated dienes typically used for preparing these copolymers are 5-ethylidene-2-norbornene (ENB), 1,4-hexadiene and 1,6-octadiene.

The solid catalyst of the present invention can have a particularly advantageous use in (co)polymerization processes of α-olefins, and especially ethylene, in solution at a high temperature. These processes are normally carried out at temperatures ranging from 130 to 300° C., preferably from 160 to 230° C., and at a pressure of 1 to 25 MPa, preferably from 5 to 20 MPa, in the presence of an inert liquid capable of maintaining the polymer which is formed, in solution, at the process temperature. In this way, a homogeneous reaction mixture is formed (except for the catalyst), together with a process which is easily controllable and flexible, which allows short residence times and high productivities. Preferred liquids, for both their solvating characteristics of polyolefins, and also for the relatively low toxicity, are aliphatic or cycloaliphatic hydrocarbons having from 6 to 10 carbon atoms, such as, heptane, decane, cyclohexane and decalin. The polymer is then separated by precipitation or by devolatilization of the solvent. For general information on known processes of this type, reference can be made, among the numerous publications available, to "Encyclopedia of Polymer Science and Engineering", 2ª edition (1986), volume 6, pages 471-472, John Wiley & Sons Ed.

As polyolefins, especially if semi-crystalline, have a low solubility in solvents, the use of relatively high temperatures, preferably from 150 to 250° C., is critical for effecting these processes. The processes are carried out in adiabatic reactors, or isotherms, depending on the technology adopted. It is known, however, that in polymerization processes at such high temperatures, the average molecular weight of the polymer obtained is significantly lowered, leading to Melt Flow Index (MFI) levels which are so high as to be unacceptable for normal transformation processes. The catalysts generally used in processes in solution are based on vanadium. They are not capable however of producing polyolefins with satisfactory molecular weights for a wide range of applications, thus limiting the diffusion of the process itself, in spite of the above advantages. Furthermore, there are margins for further improvement also in relation to the activity of these catalysts. The known catalysts of the Ziegler-Natta type based on titanium, on the other hand, normally used in suspension processes, are also less suitable than the previous catalysts when used at a high temperature, producing polyethylenes with particularly low molecular weights and unsuitable for most of the normal applications.

The catalyst according to the present invention unexpectedly allows high average molecular weights of the ethylene polymers and copolymers, to be obtained, also operating at the above high temperatures, obtaining much lower MFI values (also of one order of magnitude) with respect to the traditional catalysts used under the same process conditions. In this respect, it has been found that polymerization processes with a high productivity effected with this catalyst at temperatures higher than 180° C., have allowed polymers to be obtained with a Melt Flow Index, at 2.16 kg, lower than 0.5 dg/min, whereas polyethylenes having a similar composition obtained with a process under the same conditions showed MFI values higher than 1.0 dg/min.

The present invention, in its numerous aspects, is more specifically illustrated by the following examples, which are provided for purely illustrative purposes, without in any way forming or being considered a limitation of the overall scope of the invention itself.

ILLUSTRATION OF THE FIGURES

FIG. 1 represents the diagram of the sedimentation rate of the solid from the mother liquor in the consecutive examples from 1 to 4, according to the present invention. In the ordinate of the diagram there is the "sedimentation volume" of the solid and, in the abscissa, the time in minutes.

FIG. 2 represents the XPS spectrum registered for the model compounds prepared according to the following Model Examples, in order to identify the nature of the catalytic sites of the present catalyst. In the ordinate, there is the N(E)/E variable, which represents, in normalized form relating to the measurement of the highest peak of the spectrum, arbitrarily considered as equal to 10, the number of surface electrons having a certain BE (Binding Energy), whereas in the abscissa, the scale of BE values is indicated.

FIG. 3 represents the XPS spectrum registered for a catalyst of the present invention obtained according to the following Example 13, superimposed with the XPS spectrum registered for the catalyst precursor P1 obtained according to the following Example 1.

The variables in the ordinate and abscissa have the same meaning as the previous FIG. 2.

EXAMPLES

Reagents and Materials

The reagents and materials used in the following examples of the invention, and their possible pretreatment, are indicated in the following list; the producer is indicated in brackets.

Titanium trichloride (Aldrich, 99%): used as such
Titanium tetrachloride (Aldrich, 99.9%): distilled
Tetrahydrofuran (Carlo Erba, RPE): anhydrified by distillation on $LiAlH_4$
n-Pentane (Carlo Erba, RPE): anhydrified by distillation on NaH
n-Heptane (Carlo Erba, RPE): anhydrified by distillation on NaH
n-Hexane (Carlo Erba, RPE): anhydrified by distilla tion on NaH
Methylene chloride (Carlo Erba, RPE): anhydrified by distillation on $P_2O_5$
Sodium sand in a 30% dispersion of toluene (Aldrich): used after being filtered, washed with heptane (3 times) and dried under vacuum.
Triisobutylaluminium (TIBAL) (Crompton, pure): used as such
Triethylaluminium (TEA) (Crompton, pure): used as such
Diethylaluminium chloride (DEAC) (Crompton, pure): used as such
Diisobutylaluminium chloride (DIBAC): 97%, Aldrich
Dimethylaluminium chloride (DMAC): 97%, Aldrich
Ethylaluminium sesquichloride (EASC): 97%, Aldrich
Isobutylaluminium dichloride (IBADIC): 99%, Akzo-Nobel
n-Decane: pure, 95%, (Synthesis-Parma), treated on molecular sieves 4 Å and 10 Å, of Grace Davison
Ethyl alcohol: Carlo Erba, RPE
1-Hexene: 97%, Aldrich, distillated on calcium hydride
Ethylene: Rivoira Grade 3.5, Purity 99.95%
Acetone: Carlo Erba, RPH
Anhydrous Magnesium Chloride (Cezus-Areva): >99%, grade T.202, used as such
Titanium Tetrabutylate (TNBT VERTEC): Johnson Matthey Catalysts, purity >98%
Hafnium Tetrachloride (Cezus-Areva): >95%, grade 101, used as such
2-ethylhexanoic acid: (Gamma Chimica): treated on molecular sieves 4 A
Elemental Analysis
a) Determination of Mg, Al, Hf and Ti.

For the determination of the quantity by weight of the metals Mg, Al, Hf and Ti, in the precursors and solid catalysts of the present invention, an aliquot weighed exactly, operating in a dry-box under a flow of nitrogen, of about 30-50 mg of sample, was placed in a platinum crucible of about 30 ml, together with a mixture of 1 ml of HF at 40%, 0.25 ml of $H_2SO_4$ at 96% and 1 ml of $HNO_3$ at 70%. The crucible was then heated on a plate increasing the temperature until the appearance of white sulphuric fumes (about 200° C.). The mixture thus obtained was cooled to room temperature, 1 ml of $HNO_3$ at 70% was added and the mixture was then brought again to the appearance of fumes. After repeating the sequence a further two times, a limpid, almost colourless solution was obtained. 1 ml of $HNO_3$ and about 15 ml of water were then added without heat, heating to 80° C. for about 30 minutes. The sample thus prepared was diluted with water having a MilliQ purity up to a weight of about 50 g, weighed exactly, to obtain a solution on which the instrumental analytic determination was effected using an ICP-OES (optical detection plasma) Thermo Optek IRIS Advantage Duo, for comparison with solutions at a known concentration. For this purpose, for each analyte, a calibration line within the range of 0-10 ppm was prepared, measuring solutions with a known titre obtained by dilution by weight of certified solutions.

The solution of the sample prepared as described above was diluted again by weight so as to obtain concentrations close to those used as reference, before effecting spectrophotometric analysis. All the samples were prepared in duplicate. The results were considered acceptable if the single data of the tests in duplicate did not differ by more than 2% relative with respect to their average value.

b) Chlorine Determination

Approximately 30-50 mg of sample were weighed exactly in 100 ml glasses in a dry-box under a stream of nitrogen. 2 g of $Na_2CO_3$ were added and 50 ml of MillQ water were added, outside the dry-box. The mixture was brought to boiling point on a plate under magnetic stirring for about 30 minutes. It was left to cool, diluted $H_2SO_4$ ⅕ was added until the reaction became acid and the mixture was titrated with $AgNO_3$ 0.1 N with a potentiometer titimeter.

Porosimetric Analysis

The analysis of the pore volume, surface area and density of the catalytic solids was effected by means of a mercury porosimeter, using porosimeters of the Pascal series 140 (macropores) and 240 (meso-micropores), produced by Thermo Finnigan. The parameters established on the instruments were the following:

Porosimeter Pascal 140:
    pump velocity set: 6;
    pressure range: 0.1–200 kPa;
    intrusion time: 25 minutes;
    decompression time: 20 minutes;

Porosimeter Pascal 240:
    pump velocity set: 5;
    pressure range: 0.1-200 MPa.
    intrusion time: 25 minutes;
    decompression time: 20 minutes.

Granulometric Analysis

The determination of the average particle size and distribution of the catalytic solids was effected with the optical method using a MALVERN Particle Sizer, Series 2600, having a focalization lens of 63 mm and a cell optical path of 2 mm.

XPS Spectroscopy

The characterization by XPS spectroscopy was effected with a Physical Electronics spectrometer (mod. PHI-5600), with an aluminium monochromatized source for the generation of X-rays (energy of the X-rays inciding on the sample=1486.6 eV). The technique is based on the photoelectric effect, from which the photoelectrons emitted from the surface of the sample irradiated, are collected and analyzed. The analyses are effected in an ultra-high-vacuum environment (UHV=$1.32 \cdot 10^{-7}$ Pa) at room temperature. In order to compensate the positive charge, which is produced on the surface following the photoemission process, the sample is struck with a beam of low-energy electrons (neutralizer). The analysis area is circular with a diameter of 0.8 mm and the sampling depth is only 10 nm approximately. This is a surface analysis, capable of revealing the presence of most external chemical species.

The samples of the catalysts analyzed and their precursors are exclusively solid. Due to their reactivity, they were charged into a dry-box inside a sealed transferor, in a dry nitrogen environment, and were then transferred to the UHV vacuum chamber without exposure to the air.

A quantitative response is obtained from the XPS spectrum, relating to the atomic percentage of the most abundant elements, excluding hydrogen. The single components of a particular chemical element with a different electronic neighbourhood can also be obtained, from the spectra of the single elements acquired in high resolution. In this case, the peak of Cl 2 p has served as internal energy reference, to define an absolute position on the scale of the abscissa, establishing its maximum at 199.0 eV. The other peaks can therefore be translated into energy and can be separated into their components, attributable to species with a different neighbourhood. The XPS spectrum is expressed in terms of Binding Energy (B.E.), i.e. the energy necessary for removing a surface electron. Each element is identified by one or more peaks in a characteristic position, depending on the electronic neighbourhood present on the surface. The width of each peak provides further information (FWHM) and its surface area is proportional to the relative weight of the constituent. A more detailed description of the XPS spectroscopy technique and its use in surface analysis is provided, among others, in the publication: J. F. Moulder, W. F. Stickle, P. E. Sobol, K. D. Bomben, Handbook of X-Ray Photoelectron Spectroscopy; editore J. Chastain, Physical Electronics Div., Eden Prairie, Mo. USA (1992).

IR and NMR Spectroscopy

The composition of the organic residue in the solid catalysts and precursors according to the present invention was determined by means of IR and NMR spectroscopy.

The FT-IR analysis was carried out with a Nicolet Nexus spectrometer within the range of 4000-200 $cm^{-1}$, with 64 scans and nominal resolution equal to 2 $cm^{-1}$. The powders of the solid samples being examined (about 10 mg) were treated with about 10 ml of HCl at 5% in water, for about 30 minutes at room temperature. The suspension obtained was extracted three times with a total of 20 ml of decane. The organic solution, brought to a volume of 30 ml, was analyzed in transmission, subtracting the bands relating to decane. The quantitative IR determination of the carboxylate was effected by calibration with dilute solutions at a known concentration of carboxylic acid, measuring the band from 1650 a 1775 nm.

The $^{13}C$-NMR spectra were obtained with a Bruker spectrometer Mod. MSL of 200 MHz equipped with a 7 mm probe. The experimental conditions were the following: ANTIFOND.PC impulse sequence; impulse duration 5 µs; acquisition time 50 ms; relaxation time 5 s.

Characterization of the Polymers and Copolymers

The content of monomeric units deriving from 1-hexene, in ethylene-1-hexene copolymers, was determined on samples in the form of a film using the FT-IR Nicolet Nexus spectrometer according to the previous paragraph, by measuring the absorptions of the bands at 4390 and 4255 $cm^{-1}$, and on the basis of calibration curves prepared with copolymers with a known composition.

The Melt Flow Index, MFI of the polymers was measured according to the standard ASTM D-1238 E, with a weight of 2.16 kg.

The density of the polymeric products obtained was measured by means of a gradient column, according to the method ASTM D1505-68.

Example 1

Catalyst Precursor with a High Particle-Size P1

The following products are charged in order, at room temperature into a stirred jacketed reactor having a volume of 500 litres: 180 litres of n-decane, 17.58 kg of magnesium chloride and 7.1 kg hafnium tetrachloride. After leaving the mixture to homogenize under stirring for 10 minutes, 5.7 kg of titanium tetrabutylate and 89.5 kg (620 moles) of 2-ethylhexanoic acid are added. The air is removed from the reactor by creating a vacuum up to 5 kPa, still at room temperature. With the reactor closed and under stirring, the mixture is heated through the external jacket, until it is brought to 90° C., maintaining the temperature for 1 hour. At the end, the pressure inside the reactor reaches 121 kPa.

The mixture thus obtained, still containing undissolved solid, is hot filtered with a COMBER filter press having a surface of 1 square metre, with a 25 micron mesh net, and then transferred to a stirred jacketed reactor having a volume of 1,600 litres. 3.51 kg of solid are recovered from the net of the filter, which upon analysis proves to be exclusively composed of magnesium chloride.

376 kg (2.45 kmoles) of IBADIC in a solution at 42.5% by weight in n-decane are slowly added to the filtered solution, after cooling to room temperature, the mixture being substantially maintained homogeneous by vigorous stirring and accurately controlling the feeding flow-rate and thermostatic circulation so that the temperature of the reaction mixture during the addition is within the range of 29 to 43° C. After about 3 hours, the addition of IBADIC under the above conditions is completed, and the reaction mixture, still under stirring, is brought, with the reactor closed, to a temperature of 90° C. for two hours. The pressure of the reactor rises to 251 kPa. The formation is observed of a purple-dark brown-coloured solid in suspension.

Respecting the conditions described above determines the microporosity and particle-size characteristics of the solid precursor thus obtained and consequently times and modes of the subsequent preparation phases.

The solid precursor is separated from the mother liquor by decanting. The sedimentation rate is greater for solid precursors having a higher particle-size, as can be observed from the diagram shown in FIG. 1, which represents the sedimentation rate of the solid from the mother liquor. The data are provided for examples 1 to 4 The percentage sedimentation volume represents the volume of the opaque water containing the solid in suspension (on the basis of the separation line from the overlying clear water, determined visibly), with respect to the total volume.

The suspension of the solid precursor is left to rest for about 30 minutes until a sedimentation volume of 390 litres is obtained. The overlying clear water is separated and a volume of 600 litres of fresh n-decane is then added, stirring the mixture until a homogeneously dispersed suspension is obtained again. A second decanting is then effected for a time of about 60 minutes, up to a sedimentation volume of 150 litres.

The approximately 150 litres of suspension prepared as described above are transferred and filtered in a COMBER filter press having a filtering surface of 1 square metre, with a geometric volume of 1,500 litres, in a nitrogen atmosphere. Three washings are effected on the same filter, with three aliquots of 500 litres of n-decane, separating the liquid from the solid by filtration with each washing. With the third washing it is observed that the molar concentration of aluminium soluble in the solvent is 0.6 mmoles/litre. After drying, 30 kg of purple-coloured solid catalyst precursor P1 are obtained, which are kept under nitrogen for the subsequent uses.

An aliquot of about 1 g of the above solid precursor P1 is dried under vacuum and used for the relative characterization. From elemental analysis by means of ICP, the solid precursor proves to have the following contents of active metals (weight %): Mg=12.16; Ti=2.82; Hf=14.56; Al=1.90, whereas the quantity of Cl, determined by potentiometric titration is equal to 60.32% by weight. The catalyst precursor P1 therefore proves to have the following elemental atomic ratios with respect to the titanium:

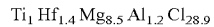

$$Ti_1 Hf_{1.4} Mg_{8.5} Al_{1.2} Cl_{28.9}$$

The remaining 8% of the weight of the solid precursor substantially consists of organic residue and a minimum part (<0.5% by weight) of impurities, whose nature was not further determined, both in the case of the present example and also in the preparations of the precursors as described in the subsequent examples. The organic residue of the precursor P1, analyzed by means of FTIR and $^{13}$CNMR, proved to contain about 5% by weight of 2-ethylhexanoate residues with respect to the total weight of the precursor, with traces of less than 1% by weight with respect to the total, of alcoholates.

The precursor P1 thus obtained was further characterized by means of porosimetric analysis, whose results are indicated in the following Table 1, and by means of XPS spectroscopy, obtaining the spectrum shown in FIG. 3, curve D. Granulometric analysis revealed an average dimension of the granules of 5.6 μm and a distribution which is such that 80% by weight of the granules have a dimension ranging from 2.3 e 15.8 μm.

Example 2

Catalyst Precursor with a High Particle-Size P2

The same procedure as that of the previous Example 1 is initially adopted, with the difference that 8.79 kg of magnesium chloride and 5.42 kg hafnium tetrachloride are charged into the stirred jacketed reactor. After stirring the mixture for 10 minutes, 5.7 kg of titanium tetrabutylate and 52.7 kg of 2-ethylhexanoic acid are added. The mixture is then reacted with the reactor closed as described in the previous Example 1. At the end, the pressure inside the reactor at a temperature of 90° C., reaches a value of 123 kPa.

The mixture thus obtained, only slightly turbid, is hot filtered and transferred to a stirred 160 litre reactor, as in the previous example, but without recovering significant quantities of solid on the filter. After cooling to room temperature, 237 kg of IBADIC at 42.5% by weight in n-decane are added to the solution, accurately controlling the feeding flow-rate and thermostatic circulation so that the temperature of the reaction mixture during the addition is within the range of 29 to 40° C.

After 2 hours and 30 minutes, the addition of IBADIC under the above conditions is completed, and the reaction mixture, still under stirring and with the reactor closed, is brought to a temperature of 90° C. for two hours. The pressure of the reactor rises to 251 kPa.

The formation is observed of a purple-dark brown-coloured solid in suspension.

Respecting the conditions described above determines the microporosity and particle-size characteristics of the solid precursor thus obtained and consequently times and modes of the subsequent preparation phases.

The solid precursor is separated from the mother liquor by decanting. The sedimentation rate is represented by the curve indicated with wording "Example 2" in the diagram of FIG. 1.

The suspension of the solid precursor is left to rest for about 30 minutes until a sedimentation volume of 400 litres is obtained. A volume of 600 litres of fresh n-decane is then added, stirring the mixture until a homogeneously dispersed suspension is obtained again. A second decanting is then effected for a time of about 5 hours, up to a sedimentation volume of 150 litres. The suspension thus concentrated is subjected to washing and filtration analogously to what is effected according to the previous Example 1. At the end of the third washing, it is observed that the molar concentration of aluminium soluble in the solvent is 0.5 mmoles/litre. 20 kg of purple-coloured solid catalyst precursor P2 are thus obtained, which are kept under nitrogen for the subsequent uses.

An aliquot of about 1 g of the above solid precursor P2 is dried under vacuum for 8 hours and used for the relative characterization. From elemental analysis by means of ICP, the following composition is obtained (weight %): Mg=8.95; Ti=4.25; Hf=15.27; Al=5.45 The quantity of Cl, determined by potentiometric titration is equal to 64.0% by weight. The catalyst precursor P2 therefore proves to have the following elemental atomic ratios with respect to the titanium:

$$Ti_1 Hf_{1.0} Mg_{4.2} Al_{2.3} Cl_{20.3}$$

The precursor thus obtained was further characterized by means of porosimetric analysis, whose results are indicated in the following Table 1.

Example 3

Catalyst Precursor with a High Particle-Size P3

The same procedure as that of the previous Example 1 is initially adopted, with the difference that 19.44 kg of magnesium chloride and 10.9 kg of hafnium tetrachloride are charged into the stirred jacketed reactor. After stirring the mixture for 10 minutes, 5.7 kg of titanium tetrabutylate and 103 kg of 2-ethylhexanoic acid are added. The mixture is then reacted with the reactor closed as described in the previous Example 1 At the end, the pressure inside the reactor at a temperature of 90° C., reaches a value of 123 kPa.

The mixture thus obtained, still containing undissolved solid, is hot filtered and transferred to a stirred reactor, as in Example 1. 1.5 kg of solid is recovered from the filter net, which upon analysis proves to exclusively composed of magnesium chloride. After cooling to room temperature, 428 kg of IBADIC at 42.5% by weight in n-decane are added to the solution, accurately controlling the feeding flow-rate and thermostatic circulation so that the temperature of the reaction mixture during the addition is within the range of 29 to 40° C.

After 3 hours and 30 minutes, the addition of IBADIC under the above conditions is completed, and the reaction mixture, still under stirring and with the reactor closed, is brought to a temperature of 90° C. for two hours. The pressure of the reactor rises to 250 kPa.

The formation is observed of a purple-dark brown-coloured solid in suspension.

The solid precursor is separated from the mother liquor by decanting. The sedimentation rate of the solid is represented by the curve indicated with wording "Example 3" in the diagram of FIG. 1.

The suspension of the solid precursor is left to rest for about 2 hours until a sedimentation volume of 390 litres is obtained. A volume of 600 litres of fresh n-decane is then added, stirring the mixture until a homogeneously dispersed suspension is obtained again. A second decanting is then effected for a time of about 5 hours, up to a sedimentation volume of 150 litres. The suspension thus concentrated is subjected to filtration and washing analogously to what is effected according to the previous Example 1 At the end of the third washing, it is observed that the molar concentration of aluminium soluble in the solvent is 0.7 mmoles/litre.

30 kg of purple-coloured solid catalyst precursor P3 are thus obtained, which are kept under nitrogen for the subsequent uses.

An aliquot of about 1 g of the above solid precursor P2 is dried under vacuum for 8 hours and used for the relative characterization. From elemental analysis by means of ICP, the following composition is obtained (weight %): Mg=13.65; Ti=2.25; Hf=15.44; Al=2.57. The quantity of Cl, determined by potentiometric titration is equal to 65.03% by weight. The catalyst precursor P3 therefore proves to have the following elemental atomic ratios with respect to the titanium:

$$Ti_1 Hf_{1.8} Mg_{11.9} Al_{2.0} Cl_{39.0}$$

Example 4

Comparative

Catalyst Precursor with a Dispersed Particle-Size

A solution in decane of chlorocarboxylates of Ti, Mg and Hf is prepared, exactly repeating the first step of the previous Example 1 The filtered solution is transferred to a stirred jacketed reactor having a geometric volume of 1,350 litres, in which the alkylation is effected with 424 kg of IBADIC at 37.75% by weight in n-decane, the mixture being substantially kept homogenous by vigorous stirring and following the procedure and operations described in the previous Example 1, with the only difference that the initial temperature of the reaction mixture was 23° C. and the maximum temperature, reached after adding about 300 kg of IBADIC over a period of 150 minutes, was 40° C. The suspension thus obtained is then heated to 80° C. for 2 hours in a closed reactor (P=260 kPa), cooled to room temperature and left to rest to favour the sedimentation of the solid precursor.

In this case, however, it was found that the solid obtained is finely dispersed and does not give rise to the rapid sedimentation observed for the solid of Example 1 After about 10 hours, a sedimented suspension of 350 litres is separated, by decanting of the overlying liquid, still containing a part of fine particulate. 600 litres of decane are added to the suspension, which is stirred and left to rest again for hours. A volume of 440 litres of suspension is separated and the washing is repeated with 400 litres of decane. At the end, about 300 litres of suspension are obtained, which is filtered and washed following the same procedure described in Example 1.

About 30 kg of dark brown-coloured solid catalyst precursor P4 (comparative) are thus obtained, which are kept under nitrogen for the subsequent uses.

From elemental analysis by means of ICP of the precursor P4, the following composition is obtained (weight %): Mg=11.5; Ti=2.76; Hf=13.35; Al=2.04. The quantity of Cl, determined by potentiometric titration is equal to 59.55% by weight. The catalyst precursor P4 (comparative) therefore proves to have the following elemental atomic ratios with respect to the titanium: $Ti_1 Hf_{1.3} Mg_{8.2} Al_{1.3} Cl_{29.1}$.

With the innovative catalyst precursors P1, P2 and P3, it is therefore possible to obtain significant increases in the sedimentation and decanting rates. This allows a considerable increase (even up to two times) in the daily production per cubic metre of the reactor used for the synthesis of the precursor, in addition to a reduction in the volumes necessary for the transportation and storage of the suspension of the precursor and catalyst obtained therefrom.

TABLE 1 porosimetric analysis of the precursors produced according to the previous examples 1, 2, 3 and 4

| Example | Precursor | V.T.[1] | Surface area ($m^2/g$) | Porosity (vol. %) | Density ($g/cm^3$) |
|---|---|---|---|---|---|
| 1 | P1 | 0.15 | 20.3 | 20.5 | 2.45 |
| 2 | P2 | 0.13 | 19.6 | 19.9 | 2.51 |
| 3 | P3 | 0.15 | 21.2 | 18.9 | 2.34 |
| 4 (comp.) | P4 | 0.22 | 35.8 | 33.0 | 1.49 |

[1]Total intrusion volume expressed as $cm^3/g$

Example 5

Copolymerization of Ethylene and 1-Hexene with Precursor P1

A vacuum-nitrogen flushing is exerted for at least three times and for an overall duration of about 2 hours in a 5-litre steel autoclave, of the Brignole type, equipped with a burette for the addition of the catalyst, a propeller stirrer and a heating thermoresistance connected to a thermostat for the temperature control. A solution containing 1,900 ml of decane, 75 ml of 1-hexene and 2.73 ml of an 0.1 M solution of TIBAL (0.273 mmoles) in n-decane as cocatalyst (molar ratio Al/Ti=49) is introduced into the autoclave.

The temperature inside the reactor is brought to 190° C., and 9.5 mg of the precursor P1, obtained according to the previous Example 1 (5.58 µmoles of Ti), is introduced, by means of the burette under a slight overpressure of ethylene, as a suspension in about 10 ml of decane. The autoclave is pressurized with ethylene, under constant stirring, until a total pressure is reached in the autoclave equal to 1.5 MPa. The heating of the thermoresistance is interrupted and a temperature increase is observed due to the exothermicity of the polymerization reaction. The entity of the enthalpy variation (ΔH) can be directly correlated to the activity of the ethylene converted and proportional to the catalytic activity obtained, the ethylene flow necessary for replacing the ethylene converted into polymer, is also registered by means of ASA flow-meters calibrated with an analog volume meter. The polymerization is continued for 3 minutes, maintaining the system at a constant pressure of 1.5 MPa. At the end, the reaction is interrupted by the introduction of about 10 ml of ethanol into the autoclave. The mixture is left to cool and the contents of the reactor are subsequently discharged into about 3 litres of ethanol. The polymer is separated by filtration, washed with acetone and dried in an oven under vacuum (about 100 Pa) at 90° C. for about 12 hours. At the end, 37 g of ethylene-1-hexene copolymer are obtained, which is characterized by measuring the content of 1-hexene, the Melt Flow Index and the density. The results are indicated in Table 2 below.

Example 6

Copolymerization of Ethylene and 1-Hexene with Precursor P2

The same procedure is adopted as described in the previous Example 5, with the difference that 11.2 mg of the precursor P2 (11.1 µmoles Ti), are introduced into the autoclave as a suspension in about 15 ml of n-decane, and 5.44 ml of an 0.1 M solution of TIBAL (0.544 mmoles) in n-decane as cocatalyst (molar ratio Al/Ti=49). At the end, 28 g of ethylene-1-hexene copolymer are obtained, having the characteristics indicated in Table 2.

Example 7

Copolymerization of Ethylene and 1-Hexene with Precursor P3

The same procedure is adopted as described in the previous Example 5, with the difference that 21.5 mg of the precursor P3 (11.2 µmoles Ti), are introduced into the autoclave as a suspension in about 10 ml of n-decane, and 5.49 ml of an 0.1 M solution of TIBAL, respectively. At the end, 62 g of ethylene-1-hexene copolymer are obtained, having the characteristics indicated in Table 2.

Example 8

Comparative

Copolymerization of Ethylene and 1-Hexene with Precursor P4

The same procedure is adopted as described in the previous Example 5, with the difference that 9.53 mg of the precursor P4 (5.49 µmoles Ti), are introduced into the autoclave as a suspension in about 10 ml of n-decane, and 2.69 ml of an 0.1 M solution of TIBAL, respectively. At the end, 23 g of ethylene-1-hexene copolymer are obtained, having the characteristics indicated in Table 2.

TABLE 2 copolymerization of ethylene-1-hexene with catalysts based on the precursors P1-P4; initial T 190° C.; cocatalyst TIBAL; molar ratio TIBAL/Ti = 49; $P_{ethylene}$ = 1.5 MPa

| Example | Precursor | Ti (mg) | 1-hexene (ml) | Yield (g) | Activity ($kg/g_{Ti}$) | M.F.I. 2.16 g/10' | Density g/cc |
|---|---|---|---|---|---|---|---|
| 5 | P1 | 0.26 | 75 | 37 | 137 | 0.11 | 0.925 |
| 6 | P2 | 0.53 | 75 | 28 | 53 | 0.09 | 0.923 |
| 7 | P3 | 0.53 | 75 | 62 | 116 | 0.19 | 0.924 |
| 8 | P4 | 0.26 | 75 | 23 | 88 | 0.12 | 0.924 |

From examining the data in Table 2, it can be noted that the catalytic activity of Examples 5 and 7, expressed as $kg/g_{Ti}$, is much higher with respect to that of comparative Example 8. The catalytic activity obtained in Example 6, with a precursor according to the present invention, is lower than that of Example 5, but also Example 8, as can be expected for a catalyst with a low atomic ratio Mg/Ti=4 with respect to other examples in the table, in which the ratio is 8 or 12. Against a relatively low productivity, the precursor P2, on the other hand, allow very high average molecular weights to be obtained in Example 6.

Example 9

Catalyst "P1+IBADIC" with $Al_{(IBADIC)}/Ti=20$ 1.54 kg of the solid precursor P1, prepared according to said Example 1, 12 litres of n-decane and 2.81 kg (18.1 moles) of IBADIC (molar ratio Al/Ti=20, Cl/Ti=40) are introduced into a stainless steel reactor equipped with mechanical stirring having a volume of 48 litres. The mixture is left under stirring for about 60 minutes at room temperature.

The solvent is removed by filtration under a nitrogen pressure on a filter with a stainless steel net with 5μm mesh, having a volume of about 80 litres and a diameter of 40 cm, supplied by the company Faucitano S.r.l. and the residue is washed a further two times with aliquots of 25 litres of n-decane. The catalyst thus obtained (1.52 kg) is re-suspended in 7 litres of n-decane (final concentration of solid 23% by weight) and maintained in suspension for the subsequent uses.

An aliquot of about 10 ml of said catalyst in suspension is collected for analytical purposes by siphoning in a tailed test-tube equipped with a porous septum, again operating under nitrogen. It is filtered, washed twice with aliquots of 50 ml of n-hexane each and the solid catalyst dried under vacuum for about 8 hours. Elemental analysis of the sample, effected with the methods described above, provided the following results (weight %): Mg=12.20; Ti=2.80; Hf=14.49; Al=1.96, Cl, 60.41%. The following atomic ratios can therefore be calculated with respect to the titanium: $Ti_1 Hf_{1.4} Mg_{8.6} Al_{1.2} Cl_{29.1}$ As can be observed, the treatment with aluminium alkyl chloride (IBADIC) in accordance with step (v) of the preparation process of the catalyst according to the present invention, does not significantly modify the composition of the solid precursor obtained at the end of step (iv) of the process according to the invention, even if it considerably increases its activity. This behaviour was systematically revealed during various laboratory tests, and consequently, in the following examples, the composition of the catalysts thus prepared was considered the same as the precursor, without proceeding each time with elemental analysis.

The spectrum was registered on the same sample of catalyst by means of $^{13}$C-NMR in the solid state, under complete proton decoupling conditions, in order to determine the residence of carboxylates in the organic residue after further treatment with IBADIC. In the spectrum, the following can be clearly observed: the signal at 191 pm of carboxylic CO, the signal at about 50 ppm attributed to the CH of ethyl hexanoate and, between 30 and 10 ppm, the signals characteristic of the aliphatic carbons (attributions indicated in the publication "Carbon-13 NMR Spectroscopy", E. Breitmaier, W. Voelter, VCH, $3^a$ edition, 1987, pages 226-228). The same signals, with the same relative intensities are clearly visible, by comparison, with a $^{13}$C-NMR spectrum registered, under analogous conditions, on a solid sample of the precursor P1. In conclusion, it can be affirmed that the treatment with IBADIC, even up to very high Al/Ti molar ratios, does not significantly modify the quantity of carboxylate present in the catalyst precursor.

Example 10

Catalyst "P1+IBADIC" with $Al_{(IBADIC)}/Ti=50$

A catalyst was prepared, repeating the procedure of the previous Example 9, but using 1.48 kg of precursor P1, prepared according to Example 1, and 6.71 kg of IBADIC (43.3 moles), so that $Al_{(IBADIC)}/Ti=50$ and Cl/Ti=100.

Example 11

Catalyst "P1+IBADIC" with $Al_{(IBADIC)}/Ti=100$

A catalyst was prepared, repeating the procedure of the previous Example 9, but using 1.45 kg of precursor P1, prepared according to Example 1, and 13.24 kg of IBADIC (85.4 moles), so that $Al_{(IBADIC)}/Ti=100$ and Cl/Ti=200.

Example 12

Catalyst "P1+IBADIC" with $Al_{(IBADIC)}/Ti=200$

A catalyst was prepared, repeating the procedure of the previous Example 9, but using 1.51 kg of precursor P1, prepared according to Example 1, and 27.6 kg of IBADIC (177.9 moles), so that $Al_{(IBADIC)}/Ti=200$ and Cl/Ti=400.

Example 13

Catalyst "P1+DEAC" with $Al_{(DEAC)}/Ti=50$

A catalyst was prepared, repeating the procedure of the previous Example 9, but using 1.48 kg of precursor P1, prepared according to Example 1, and 5.23 kg of DEAC (43.4 moles) instead of IBADIC, so that $Al_{(DEAC)}/Ti=50$ and Cl/Ti=50.

Example 14

Catalyst "P1+DEAC" with $Al_{(DEAC)}/Ti=100$

A catalyst was prepared, repeating the procedure of the previous Example 13, but using 1.52 kg of precursor P1, prepared according to Example 1, and 10.7 kg of DEAC (88.7 moles), so that $Al_{(DEAC)}/Ti=100$ and Cl/Ti=100.

Example 15

Catalyst "P1+DEAC" with $Al_{(DEAC)}/Ti=200$

A catalyst was prepared, repeating the procedure of the previous Example 13, but using 1.53 kg of precursor P1, prepared according to Example 1, and 21.6 kg of DEAC (179 moles), so that $Al_{(DEAC)}/Ti=200$ and Cl/Ti=200.

Example 16

Catalyst "P2+IBADIC" with $Al_{(IBADIC)}/Ti=50$

A catalyst was prepared, repeating the procedure of the previous Example 9, but using 1.45 kg of precursor P2, prepared according to Example 2 instead of the precursor P1, and 9.98 kg of IBADIC (64.4 moles), so that $Al_{(IBADIC)}/Ti=50$ and Cl/Ti=100.

Example 17

Catalyst "P2+IBADIC" with $Al_{(IBADIC)}/Ti=100$

A catalyst was prepared, repeating the procedure of the previous Example 16, but using 1.49 kg of precursor P2, prepared according to Example 2, and 20.5 kg of IBADIC (132 moles), so that $Al_{(IBADIC)}/Ti=100$ and $Cl/Ti=200$.

Example 18

Catalyst "P2+IBADIC" with $Al_{(IBADIC)}/Ti=200$

A catalyst was prepared, repeating the procedure of the previous Example 16, but using 1.52 kg of precursor P2, prepared according to Example 2, and 41.8 kg of IBADIC (270 moles), so that $Al_{(IBADIC)}/Ti=200$ and $Cl/Ti=400$.

Example 19

Catalyst "P2+DEAC" with $Al_{(DEAC)}/Ti=50$

A catalyst was prepared, repeating the procedure of the previous Example 16, but using 1.50 kg of precursor P2, prepared according to Example 2, and 8.03 kg of DEAC (66.6 moles) instead of IBADIC, so that $Al_{(DEAC)}/Ti=50$ and $Cl/Ti=50$.

Example 20

Catalyst "P2+DEAC" with $Al_{(DEAC)}/Ti=100$

A catalyst was prepared, repeating the procedure of the previous Example 19, but using 1.44 kg of precursor P2, prepared according to Example 2, and 15.4 kg of DEAC (128 moles) instead of IBADIC, so that $Al_{(DEAC)}/Ti=100$ and $Cl/Ti=100$.

Example 21

Catalyst "P2+DEAC" with $Al_{(DEAC)}/Ti=200$

A catalyst was prepared, repeating the procedure of the previous Example 16, but using 1.48 kg of precursor P2, prepared according to Example 2, and 31.7 kg of DEAC (263 moles), so that $Al_{(DEAC)}/Ti=200$ and $Cl/Ti=200$.

Example 22

Catalyst "P3+IBADIC" with $Al_{(IBADIC)}/Ti=20$

A catalyst was prepared, repeating the procedure of the previous Example 9, but using instead of the precursor P1, 1.52 kg of precursor P3, prepared according to the previous Example 3, and 2.21 kg of IBADIC (14.3 moles), so that $Al_{(IBADIC)}/Ti=20$ and $Cl/Ti=40$.

Example 23

Catalyst "P3+IBADIC" with $Al_{(IBADIC)}/Ti=50$

A catalyst was prepared, repeating the procedure of the previous Example 22, but using 1.45 kg of precursor P3, prepared according to Example 3, and 5.28 kg of IBADIC (34.1 moles), so that $Al_{(IBADIC)}/Ti=50$ and $Cl/Ti\ 100$.

Example 24

Catalyst "P3+IBADIC" with $Al_{(IBADIC)}/Ti=100$

A catalyst was prepared, repeating the procedure of the previous Example 22, but using 1.50 kg of precursor P3, prepared according to Example 3, and 10.93 kg of IBADIC (70.5 moles), so that $Al_{(IBADIC)}/Ti=100$ and $Cl/Ti=200$.

Example 25

Catalyst "P3+IBADIC" with $Al_{(IBADIC)}/Ti\ 200$

A catalyst was prepared, repeating the procedure of the previous Example 22, but using 1.46 kg of precursor P3, prepared according to Example 3, and 21.3 kg of IBADIC (137.3 moles), so that $Al_{(IBADIC)}/Ti=200$ and $Cl/Ti=400$.

Example 26

Catalyst "P3+DEAC" with $Al_{(DEAC)}/Ti=50$

A catalyst was prepared, repeating the procedure of the previous Example 22, but using 1.56 kg of precursor P3, prepared according to Example 3, and 4.42 kg of DEAC (36.7 moles) instead of IBADIC, so that $Al_{(DEAC)}/Ti=50$ and $Cl/Ti=50$.

Example 27

Catalyst "P3+DEAC" with $Al_{(DEAC)}/Ti=100$

A catalyst was prepared, repeating the procedure of the previous Example 26, but using 1.54 kg of precursor P3, prepared according to Example 3, and 8.73 kg of DEAC (72.4 moles), so that $Al_{(DEAC)}/Ti=100$ and $Cl/Ti\ 100$.

Example 28

Catalyst "P3+DEAC" with $Al_{(DEAC)}/Ti=200$

A catalyst was prepared, repeating the procedure of the previous Example 26, but using 1.47 kg of precursor P3, prepared according to Example 3, and 16.7 kg of DEAC (138 moles), so that $Al_{(DEAC)}/Ti=200$ and $Cl/Ti=200$.

Example 29

Copolymerization of Ethylene and 1-Hexene to LLDPE

A vacuum-nitrogen flushing is exerted for at least three times and for an overall duration of about 2 hours in a 5-litre steel autoclave, of the Brignole type, equipped with a pressurized burette for the addition of the catalyst, a propeller stirrer and a heating thermoresistance connected to a thermostat for the temperature control. A solution containing 1,900 ml of decane, 75 ml of 1-hexene and 1.0 ml of an 1 M solution of TIBAL (1.0 mmoles) in n-decane as cocatalyst (molar ratio $Al_{TIBAL}/Ti=49$) is introduced into the autoclave.

The temperature inside the reactor is brought to 190° C., and 19.0 mg of the catalyst "P1+IBADIC" ($Al_{(IBADIC)}/Ti=20$), corresponding to 0.534 mg of Ti, prepared according to the previous Example 9 (0.0112 mmoles of Ti), is introduced, by means of the burette under a slight overpressure of ethylene, as a suspension in about 10 ml of decane. The autoclave is pressurized with ethylene, under constant stirring, until a total pressure is reached in the autoclave equal to 1.5 MPa.

The heating of the thermoresistance is interrupted and a temperature increase is observed due to the exothermicity of the polymerization reaction under pseudoadiabatic conditions, i.e. without removing the heat produced by the polymerization with cooling means. The entity of the enthalpy variation (ΔH) can be directly correlated to the quantity of ethylene polymerized and proportional to the catalytic activity obtained. The ethylene flow necessary for replacing the ethylene converted into polymer, is also registered by means of ASA flow-meters calibrated with an analog volume meter. The polymerization is continued for 3 minutes, maintaining the system at a constant pressure of 1.5 MPa. At the end, the reaction is interrupted by the introduction of about 10 ml of ethanol into the autoclave. The mixture is left to cool and the contents of the reactor are subsequently discharged into about 3 litres of ethanol. The polymer is separated by filtration, washed with acetone and dried in an oven under vacuum (about 100 Pa) at 90° C. for about 12 hours. The dried polymer is weighed to allow the calculation of the catalytic activity expressed in kg of polymer per gram of titanium, and the Melt Flow Index and density are subsequently determined, according to the methods indicated above. The results are schematically summarized in Table 3 below.

Examples 30 to 48

Numerous copolymerization tests were carried out under the same conditions previously indicated in Example 29, but using each time the catalysts prepared according to the previous Examples 10 to 28.

The results are schematically summarized in Table 3 below.

Table 3 indicates the results of the polymerization tests according to Examples 29 to 48 For each example, whose number is indicated in the first column on the left, the following are respectively listed in order: underneath the heading "Catalyst", the column "Ex. N." relating to the example number corresponding to the catalyst used in the test, the column "step (v)" relating to the combination "Precursor/Al alkyl chloride" used in step (v) of the preparation process, the Al/Ti atomic ratio in said step (v), the quantity of solid catalyst introduced into the reactor, in the column "Solid" and the corresponding quantity of Ti, in the column "Ti injected"; in the column "1-hexene", the quantity of 1-hexene introduced into the reactor; in the column ΔT, the temperature increase observed during the polymerization; in the column "Yield" the quantity of polymer obtained; in the column "Activity", the activity of the catalyst expressed in kilograms of polymer per gram of Ti; in the column M.F.I. 2.16, the Melt Flow Index with a weight of 2.16 kg; and finally the density of the polymer obtained.

Upon comparing the results of Table 3 with those indicated in Table 2, relating to polymerizations effected with the precursor, the increased activity of the catalyst following the additional treatment of the solid precursor with aluminium alkyl chloride according to step (v) of the preparation process according to the present invention, is evident.

Example 49

Comparative

For comparative purposes, the precursor P1 was treated with an aluminum trialkyl compound instead of an aluminum alkyl chloride, as step (v) of the process for the preparation of a polymerization catalyst.

Accordingly, the procedure of the previous Example was repeated on a laboratory scale. 1.45 g of precursor P1, prepared according to Example 1, and 9.73 g of triethylaluminum (TEA, 43.6 mmoli) were introduced in a stirred 1 liter glass reactor containing 0.3 l of n-decane under argon. The ratio $Al_{(TEA)}/Ti$ is 100 The mixture was left under stirring for about 60 minutes at room temperature. The solvent was removed by syphoning after decantation and the residue washed a further two times with aliquots of 0.25 l of n-decane. The solid catalyst (P1+TEA; comparative) thus obtained was re-suspended in n-decane up to a volume of 50 ml and maintained in suspension for the subsequent uses. The final concentration of solid in the suspension was 26.4 g/l (weight of solid/volume of suspension) as determined on an aliquot of 10 ml that was dried and weighed. The amount of titanium was 2.89% by weight of the dry solid.

Example 50

Comparative

Ethylene and 1-hexene were co-polymerized, for comparative purposes, in the presence of the catalyst (P1+TEA) as obtained in example 49. A 5-litre steel autoclave of the Brignole type, equipped and prepared as described in the previous example 5, was used as polymerization reactor. A solution containing 1,900 ml of decane, 75 ml of 1-hexene and 2.73 ml of an 0.1 M solution of TIBAL (0.273 mmoles) in n-decane as cocatalyst (molar ratio Al/Ti=49) is introduced into the autoclave.

The temperature inside the reactor is brought to 190° C., and 19 mg of the catalyst (P1+TEA) (0.72 ml of the suspention as obtained in example 49, corresponding to 0.549 mg, 11.5μmoles of Ti) are introduced, by means of the burette under a slight overpressure of ethylene, after dilution to about 10 ml with decane.

The autoclave is pressurized with ethylene, under constant stirring, until a total pressure is reached in the autoclave equal to 1.5 MPa. The heating of the thermoresistance is interrupted and a temperature increase is observed due to the exothermicity of the polymerization reaction. The polymerization is continued for 3 minutes, maintaining the system at a constant pressure of 1.5 MPa. At the end, the reaction is interrupted by the introduction of about 10 ml of ethanol into the autoclave. The mixture is left to cool and the contents of the reactor are subsequently discharged into about 3 litres of ethanol. The polymer is separated by filtration, washed with acetone and dried in an oven under vacuum (about 100Pa) at 90° C. for about 12 hours. At the end, 28.5 g of ethylene-1-hexene copolymer are obtained, which is characterized by measuring the content of 1-hexene, the Melt Flow Index and the density. The results are indicated in Table 3 below.

By comparing the results of this comparative example 50 with examples 31 or 34, which were carried out with catalysts obtained from the same precursor, but treated with the same molar amount of an alkylauminum cloride, it is clear that an aluminum trialkyl has no stabilizing and activating effect on the precursor, but rather deactivates it. Moreover, the properties of the obtained polymer are also unsatisfactory in that higher MFI and density are achieved, due to less 1-hexene incorporation and higher chain transfer during the polymerization reaction.

TABLE 3

Copolymerization ethylene/1-hexene; cocatalyst TIBAL; $_{initial}T = 190°C$; $P_{ethylene} = 1.5$ Mpa, time 3 minutes; $Al_{TIBAL}/Ti = 49$

| Example N. | Precurs. Ex. nr. | Catalyst Step (v) | Al/Ti St. (v) | Solid (mg) | Ti injected (mg) | 1-hexene (ml) | ΔT (°C.) | Yield (g) | Activity (kg/g$_{Ti}$) | M.F.I. 2.16 (g/10') | density (g/cm³) |
|---|---|---|---|---|---|---|---|---|---|---|---|
| 29 | 9  | P1 + IBADIC | 20  | 19.07 | 0.534 | 75 | 25 | 93.6  | 175 | 0.09 | 0.9241 |
| 30 | 10 | P1 + IBADIC | 50  | 19.07 | 0.534 | 75 | 33 | 118.6 | 222 | 0.08 | 0.9249 |
| 31 | 11 | P1 + IBADIC | 100 | 9.54  | 0.267 | 75 | 23 | 70.2  | 263 | 0.07 | 0.9237 |
| 32 | 12 | P1 + IBADIC | 200 | 19.03 | 0.533 | 75 | 34 | 136.7 | 256 | 0.06 | 0.9247 |
| 33 | 13 | P1 + DEAC   | 50  | 6.36  | 0.178 | 75 | 14 | 31.3  | 176 | 0.09 | 0.9232 |
| 34 | 14 | P1 + DEAC   | 100 | 6.43  | 0.180 | 75 | 15 | 34.3  | 191 | 0.12 | 0.9238 |
| 35 | 15 | P1 + DEAC   | 200 | 19.07 | 0.534 | 75 | 22 | 95.9  | 180 | 0.11 | 0.9233 |
| 36 | 16 | P2 + IBADIC | 50  | 12.56 | 0.534 | 75 | 9  | 36.2  | 68  | 0.10 | 0.9238 |
| 37 | 17 | P2 + IBADIC | 100 | 6.28  | 0.267 | 75 | 7  | 20.1  | 75  | 0.08 | 0.9254 |
| 38 | 18 | P2 + IBADIC | 200 | 4.19  | 0.178 | 75 | 6  | 11.3  | 63  | 0.07 | 0.9232 |
| 39 | 19 | P2 + DEAC   | 50  | 12.56 | 0.534 | 75 | 13 | 32.3  | 60  | 0.08 | 0.9254 |
| 40 | 20 | P2 + DEAC   | 100 | 12.54 | 0.533 | 75 | 16 | 34.9  | 65  | 0.07 | 0.9246 |
| 41 | 21 | P2 + DEAC   | 200 | 11.65 | 0.495 | 75 | 11 | 29.7  | 60  | 0.07 | 0.9244 |
| 42 | 22 | P3 + IBADIC | 20  | 7.91  | 0.178 | 75 | 17 | 39.5  | 222 | 0.21 | 0.9243 |
| 43 | 23 | P3 + IBADIC | 50  | 7.91  | 0.178 | 75 | 18 | 45.6  | 256 | 0.22 | 0.9254 |
| 44 | 24 | P3 + IBADIC | 100 | 8.00  | 0.180 | 75 | 18 | 50    | 278 | 0.20 | 0.9233 |
| 45 | 25 | P3 + IBADIC | 200 | 7.91  | 0.178 | 75 | 17 | 46.8  | 263 | 0.21 | 0.9231 |
| 46 | 26 | P3 + DEAC   | 50  | 7.91  | 0.178 | 75 | 14 | 30    | 169 | 0.21 | 0.9254 |
| 47 | 27 | P3 + DEAC   | 100 | 7.91  | 0.178 | 75 | 15 | 32    | 182 | 0.20 | 0.9238 |
| 48 | 28 | P3 + DEAC   | 200 | 7.91  | 0.178 | 75 | 14 | 31.2  | 175 | 0.18 | 0.9247 |
| 50 | 49 | P1 + TEA    | 100 | 19.0  | 0.723 | 75 | 8  | 28.5  | 36.5| 0.55 | 0.9337 |

XPS Characterization

In order to prepare the reference samples for the characterization of the catalyst according to the present invention by means of XPS spectroscopy, various model complexes of Ti and Al were synthesized according to the following procedures.

Model Example 1

25 ml of heptane, 1 g (2.7 mmoles) of TiCl$_3$ (THF)$_3$ and 2.7 ml (2.6 g; 21.6 mmoles) of pure DEAC, (molar ratio Al/Ti=8), were introduced into a 50 ml multi-necked flask, placed under nitrogen. The compound TiCl$_3$(THF)$_3$ was synthesized according to the process described in literature by E. Manzer (Inorganic Synthesis, vol. 21 (1982), pages 135-140).

After being left for an hour under stirring at room temperature, the solid was separated (complex M1) from the solution by filtration on a porous septum in a nitrogen atmosphere, the solid was washed three times with 5 ml of heptane each, and dried under vacuum at 0.1 Pa.

A sample of the complex M1 thus obtained was analyzed by high resolution XPS, obtaining curve B of FIG. 2.

Model Example 2

50 ml of anhydrous dodecane are charged, under argon, into a 100 ml multi-necked flask. A solution of 2.6 g of DEAC (21.6 mmoles) in 3 ml of dodecane and subsequently 1 g of TiCl$_3$(THF)$_3$ (2.7 mmoles) suspended in 20 ml of dodecane, are added in rapid succession, by means of a dripper, to the solvent heated to 180° C. After leaving the mixture for 3 minutes under stirring at 180° C., the whole mixture is cooled with a water and ice bath. These temperature conditions and duration of the reaction are similar to those adopted in the treatment of the precursor of the previous examples. A black solid is obtained (complex M2), which is separated from the solution by filtration on a porous septum G4, washed three times with heptane and dried under vacuum at 0.1 Pa.

A sample of the complex M2 thus obtained was analyzed by high resolution XPS, obtaining curve C of FIG. 2.

XPS Analysis

FIG. 2 indicates the XPS signals corresponding to the Ti 2p electrons of the solid complex TiCl$_3$(THF)$_3$ (curve A), the complex M1 (curve B) and the complex M2 (curve C), respectively. Upon analysis, the signal of TiCl$_3$(THF)$_3$ as such positioned at 459.2 eV can be observed; the treatment with DEAC (Al/Ti=8) at room temperature (complex M1) shows both a shift towards the right of the main peak (458.3eV), and also the formation of a large component with a low B.E. (456eV) which is also confirmed in the complex M2 obtained at a high temperature. The side band at 456 eV reveals the formation of a surface species of Ti which is affected by the interaction with an adduct due to the aluminium alkyl chloride and which is therefore characterized by a greater electronic charge on the metallic centre.

Two solid samples corresponding respectively to the precursor P1 obtained according to the previous example 1, and to the catalyst (Cat 13) obtained after treatment of P1 with DEAC (Al/Ti=50/1) according to the previous Example 13, were then analyzed by XPS. The samples analyzed were obtained by separating the solid from the slurry, washing with heptane and drying as previously described. The analyses are effected at room temperature. Table 4 summarizes the data relating to the surface atomic composition, expressed in percentage of the number of atoms of each species with respect to the total number of atoms (at. %).

TABLE 4

XPS elemental analysis of the catalytic solids.

| Sample | C | O | Ti | Al | Hf | Mg | Cl |
|---|---|---|---|---|---|---|---|
| P1 (at. %)     | 34 | 21 | 5.4 | 1.3 | 0.5 | 11 | 27 |
| Cat 13 (at. %) | 29 | 16 | 2.1 | 2.0 | 0.5 | 17 | 34 |

For the sample Cat 13 it can be observed that the addition of DEAC has the effect of a partial masking of the Ti which was on the surface (from 5.4 to 2.1 at. %). This therefore confirms the formation of a surface adduct following the addition of DEAC.

In order to evaluate the modifications of the electronic neighbourhood directly on the titanium species, the high resolution XPS spectra were acquired of the electronic levels of Ti 2 p. The superimposition of the Ti 2 p peaks of the catalyst Cat 13 (curve D) and the precursor P1 (curve E) before treatment with DEAC (FIG. 3), shows a definite overall shift of the peak relating to the sample Cat 13, towards a lower Binding Energy, the formation of a new component of Ti is also observed at about 456 eV. This component is the same which already clearly appeared in model systems of the type $TiCl_3$ $(THF)_3$ treated with DEAC at both room and high temperature indicated in FIG. 2. This therefore confirms the attribution of the peak at B.E. around 456 eV to the formation of a complex between Ti(+3) and a molecule of aluminium alkyl chloride. This deduction is confirmed by further UV spectroscopic analyses carried out by the Applicant on the same model compounds, in addition to samples of precursor and catalyst of the present invention, which allowed the formation of Ti (+2) species due to the action of aluminium alkyl chlorides, to be excluded.

The invention claimed is:

1. A solid catalyst, comprising:
   titanium; magnesium; aluminium; chlorine; and at least one metal (M) selected from the group consisting of hafnium and zirconium, in the following atomic ratios:
   M/Ti=0.2-5.0; Mg/Ti=3.0-15.0; Al/Ti=0.1-4.0; and Cl/Ti=15.0-60.0,
   wherein M is the at least one metal, and
   wherein at least 60% of the titanium is in oxidation state +3, and the solid catalyst has an absorption band characteristic of a binding energy in a range from 454 to 458 eV, via XPS spectroscopy.

2. The solid catalyst of claim 1, wherein the atomic ratios with respect to Ti are as follows:
   M/Ti=0.5-4.0; Mg/Ti=6.0-13.0; Al/Ti=0.2-2.0; and Cl/Ti=18.0-50.0.

3. The solid catalyst of claim 1, wherein a combined content of titanium, magnesium, the metal M, aluminium, and chlorine in the solid catalyst is at least 80% by weight, based on a total weight of the catalyst.

4. The solid catalyst of claim 1, wherein at least 80% of the titanium is in oxidation state +3, and the solid catalyst has an absorption band characteristic of a binding energy centered at 456±1 eV.

5. The solid catalyst of claim 1, in the form of a granules having a Gaussian distribution of sizes with an average diameter in a range from 2 and 15 μm, wherein 80% by weight of the granules have dimensions within a range from 1 to 30 μm.

6. The solid catalyst of claim 1, wherein a content of the titanium in the solid catalyst is up to 10% by weight, based on a total weight of the solid catalyst.

7. The solid catalyst of claim 1, further comprising:
   up to 20% by weight of a residue comprising a carboxylate.

8. A process for producing the solid catalyst of claim 1, the process comprising:
   (i) mixing a magnesium chloride, a titanium compound, a compound comprising the at least one metal M, and a carboxylic acid R—COOH, wherein R is an organic group comprising from 2 to 30 carbon atoms, in such quantities to satisfy the following atomic ratios:
   M/Ti=0.2-5.0; Mg/Ti=3.0-20.0; and R—COOH/(Mg+M)=1.5-8
   in a hydrocarbon liquid medium, to obtain a mixture, wherein at least one of the metal compounds is insoluble in the mixture;
   (ii) maintaining the mixture at a temperature in a range from 50 to 200° C. for at least one minute in a closed container, and filtering any undissolved residue, to obtain a solution;
   (iii) cooling the solution to a temperature in a range from 20 to 40° C., and adding to the cooled solution an aluminium alkyl chloride of:

$$AlR'_nCl_{(3-n)} \qquad (I),$$

wherein R' is a linear or branched alkyl radical, comprising from 1 to 20 carbon atoms, and n is a decimal number from 0.5 to 2.5,
   in at least a quantity sufficient to precipitate, in the form of a solid compound, 70% of the metals Mg, M, and Ti present in the solution, thereby obtaining a suspension;
   (iv) heating the suspension to a temperature in a range from 50 to 130° C. for a time of 5 to 180 minutes, to complete the solid precipitation, and separating the solid compound precipitated from a reaction liquid, to obtain a solid catalyst precursor;
   (v) treating the solid catalyst precursor with a second quantity of aluminium alkyl chloride of formula (I), which is the same or different from that in (iii), with an Al/Ti ratio higher than or equal to 5, at a temperature in a range from −10 to 120° C., to obtain the solid catalyst, and separating the solid catalyst from the reaction liquid.

9. The process of claim 8, wherein a temperature of the solution, during the precipitating in (iii), is not higher than 45° C. and a difference between a maximum temperature and a minimum temperature of the solution during the precipitating is equal to or lower than 15° C.

10. The process of claim 8, wherein, during (iii), the aluminium alkyl chloride of formula (I) is added in a molar quantity equal to or higher than two times a molar quantity of the carboxylic acid RCOOH employed in (i).

11. The process of claim 8, wherein, during (v), the Al/Ti ratio is in a range from 20 to 150 and the treating is carried out at a temperature in a range from 15 to 35° C.

12. The process of claim 8, wherein, during (i), the metal compounds are added in the following atomic ratios:
   M/Ti=0.5-4.0; Mg/Ti=5.0-16.0; and R—COOH/(Mg+M)=2.0-4.5.

13. The process of claim 8, wherein, during (i), a molar quantity of the carboxylic acid RCOOH is in a range from 1.2 to 5 times the equivalents of the insoluble metal compounds.

14. The process of claim 8, wherein, after (ii) and before (iii), an overall quantity of the metal compounds which remain undissolved in the mixture is at most 30% by weight, based on a total weight of the insoluble metal compounds introduced in (i).

15. The process of claim 8, wherein, during (iv), the suspension is heated to a temperature in a range from 70 to 110° C. for a time of 40 to 150 minutes.

16. The process of claim 8, further comprising after (iv) and before (v), the solid catalyst precursor is washed with a hydrocarbon solvent until a level of aluminium lower than 1.5 mM/L is reached in a mother liquor.

17. A catalytic system, comprising, in contact with each other;
   a co-catalyst comprising a hydride or an organometallic compound comprising a metal of groups 1, 2, or 13 of the periodic table of elements; and
   the solid catalyst of claim 1.

18. The catalytic system of claim 17, wherein the co-catalyst comprises an aluminium trialkyl comprising from 1 to 10 carbon atoms in each alkyl radical.

19. The catalytic system of claim 17, wherein the co-catalyst comprises an aluminum oxane.

20. The catalytic system of claim 18, wherein an atomic ratio between the aluminium in the co-catalyst and the titanium in the solid catalyst is in a range from 5:1 to 1000:1.

21. A process for (co)polymerizing an α-olefin, the process comprising:
   polymerizing an α-olefin, both in continuous and in batch, at low (0.1-1.0 MPa), medium (1.0-10 MPa), or high (10-150 MPa) pressure and at a temperature in a range from 20 to 300° C., optionally in the presence of an inert solvent, and in the presence of the catalytic system of claim 17.

22. The process of claim 21, wherein said α-olefin comprises ethylene.

23. The process of claim 21, wherein ethylene is polymerized to obtain a linear polyethylene or α-olefins comprising from 3 to 10 carbon atoms are co-polymerized.

24. The process of claim 21, being carried out in a solution of an inert solvent, at a temperature in a range from 130 to 300° C., and at a pressure in a range from 1 to 25 MPa.

25. The process of claim 24, wherein the inert solvent is an aliphatic or a cyclo-aliphatic hydrocarbon comprising from 6 to 10 carbon atoms.

26. The process of claim 21, wherein the polymerization temperature is in a range from 150 to 250° C.

* * * * *